US009840379B2

(12) United States Patent
Yang et al.

(10) Patent No.: US 9,840,379 B2
(45) Date of Patent: Dec. 12, 2017

(54) SYSTEMS AND METHODS FOR LOADING ITEMS INTO A TRAY

(71) Applicant: United States Postal Service, Washington, DC (US)

(72) Inventors: Dongliang Yang, Ellicott City, MD (US); Shao C. Yang, Rockville, MD (US); Christopher R. Simpson, Olney, MD (US); James E. Goodbar, Springfield, VA (US); Marina E. Khazanov, Rockville, MD (US); George Coupar, Leesburg, VA (US)

(73) Assignee: The United States Postal Service, Washington, DC (US)

( * ) Notice: Subject to any disclaimer, the term of this patent is extended or adjusted under 35 U.S.C. 154(b) by 0 days.

(21) Appl. No.: 15/143,244

(22) Filed: Apr. 29, 2016

(65) Prior Publication Data
US 2016/0332823 A1     Nov. 17, 2016

Related U.S. Application Data

(60) Provisional application No. 62/160,432, filed on May 12, 2015.

(51) Int. Cl.
*B65B 35/24* (2006.01)
*B65B 5/10* (2006.01)
(Continued)

(52) U.S. Cl.
CPC ...... *B65G 65/00* (2013.01); *B65G 2201/0285* (2013.01)

(58) Field of Classification Search
CPC ............ B65H 2220/01; B65H 2220/03; B65H 2511/13; B65H 2220/11; B65H 2511/30;
(Continued)

(56) References Cited

U.S. PATENT DOCUMENTS 3,102,374 A * 9/1963 Lloyd ...................... B65B 5/10
                                                         53/244
3,752,043 A * 8/1973 Rapparlie ................ B07C 1/04
                                                         271/202
(Continued)

FOREIGN PATENT DOCUMENTS

EP          0049718 A1    4/1982
FR          2680121 A1    2/1993

OTHER PUBLICATIONS

International Search Report and Written Opinion dated Aug. 12, 2016 for International Patent Application No. PCT/US16/30039, which corresponds to subject U.S. Appl. No. 15/143,244.
(Continued)

*Primary Examiner* — Gregory Adams
(74) *Attorney, Agent, or Firm* — Knobbe, Martens, Olson & Bear, LLP

(57) ABSTRACT

Features for systems and methods for loading items into a tray are disclosed. The system may have an item conveyor configured to move the items towards a tray conveyor. The tray conveyor may be configured to move trays to receive items from the item conveyor into the tray. One or more sensors may detect the height of the items on the item conveyor and/or in the tray, and/or the position of the trays on the tray conveyor. A controller may receive data related to the one or more detected heights of the items and/or the position of the trays on the tray conveyor and correspondingly control movement of the item and/or tray conveyors for efficient loading of items into the tray and efficient movement of the trays for further processing. Tray conveyor movement sensors may detect movement of the trays or tray conveyors for further control or reliability of the system.

10 Claims, 15 Drawing Sheets

(51) Int. Cl.
*B07C 3/00* (2006.01)
*B65H 31/06* (2006.01)
*B65G 65/00* (2006.01)

(58) Field of Classification Search
CPC .......... B65H 2220/02; B65H 2511/152; B65H 2511/20; B65H 29/18; B65H 29/36; B65H 31/04; B65H 31/08
USPC ...... 198/419.3, 470.1, 607, 732, 794, 803.1; 271/176, 177, 181, 214, 215, 217, 306; 414/790.4, 795.8, 798.9; 53/495, 498, 53/500, 542, 67
See application file for complete search history.

(56) References Cited

U.S. PATENT DOCUMENTS

| | | | |
|---|---|---|---|
| 4,014,458 A | 3/1977 | Berges | |
| 4,040,618 A * | 8/1977 | Vermes | B65H 29/16 271/182 |
| 4,044,910 A | 8/1977 | Box | |
| 4,161,092 A * | 7/1979 | Buday | B65B 25/141 53/244 |
| D292,743 S | 11/1987 | Hung | |
| 4,750,315 A * | 6/1988 | Wadell | B65B 43/52 53/202 |
| 4,805,890 A * | 2/1989 | Martin | B65H 29/16 271/203 |
| 4,934,687 A * | 6/1990 | Hayden | B65H 9/04 198/461.3 |
| 5,012,628 A * | 5/1991 | Van Oord | B65B 5/101 53/245 |
| 5,138,817 A * | 8/1992 | Mowry | B65B 27/08 414/789.5 |
| 5,161,709 A | 11/1992 | Oestreich, Jr. | |
| 5,235,796 A * | 8/1993 | Campbell, III | B65B 23/14 53/254 |
| 5,289,935 A | 3/1994 | Hillis et al. | |
| 5,290,025 A | 3/1994 | Plent et al. | |
| 5,556,252 A * | 9/1996 | Kuster | B65H 1/14 271/155 |
| 5,636,723 A | 6/1997 | Bulle et al. | |
| 5,743,518 A * | 4/1998 | Takashimizu | B65H 29/14 271/176 |
| H1747 H * | 9/1998 | Saeki | B65B 39/005 53/443 |
| 6,003,861 A * | 12/1999 | Iizumi | B42C 1/12 271/215 |
| D452,820 S | 1/2002 | Hacker | |
| D453,995 S | 3/2002 | Slight | |
| 6,536,191 B1 * | 3/2003 | Ruggiero | B07C 1/025 271/207 |
| 6,749,194 B2 * | 6/2004 | Hanson | B07C 3/008 271/176 |
| 6,840,513 B1 | 1/2005 | Rabindran | |
| 7,137,234 B2 * | 11/2006 | Caporali | B65B 25/143 53/249 |
| D610,001 S | 2/2010 | McAlpine | |
| 7,731,167 B2 * | 6/2010 | Prim | B65H 31/38 270/52.14 |
| D631,561 S | 1/2011 | Luciano | |
| D639,563 S | 6/2011 | Chilewich et al. | |
| D658,407 S | 5/2012 | Pung et al. | |
| 8,631,922 B2 * | 1/2014 | Stone | B65H 7/12 198/340 |
| D750,892 S | 3/2016 | Rego | |
| 9,302,811 B2 | 4/2016 | Orgeldinger | |
| D780,452 S | 3/2017 | Stratton et al. | |
| 2004/0222222 A1 | 11/2004 | Parnall et al. | |
| 2006/0138130 A1 | 6/2006 | Orgeldinger | |
| 2009/0173040 A1 * | 7/2009 | Carlson | B65B 55/20 53/250 |
| 2013/0320609 A1 * | 12/2013 | Keane | B65H 29/14 271/10.01 |
| 2014/0239577 A1 * | 8/2014 | Kato | B65H 31/10 271/213 |
| 2015/0344258 A1 * | 12/2015 | Tsumura | B65H 31/02 271/176 |

OTHER PUBLICATIONS

International Search Report and Written Opinion dated Feb. 1, 2016 for International Patent Application No. PCT/US2015/53029.

* cited by examiner

SYSTEMS AND METHODS FOR LOADING ITEMS INTO A TRAY

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims the benefit of priority under 35 U.S.C. §119(e) of U.S. Provisional Application No. 62/160,432, filed on May 12, 2015, and entitled "SYSTEMS AND METHODS FOR LOADING ITEMS INTO A TRAY," the entire disclosure of which is incorporated herein by reference for all purposes.

BACKGROUND

Field of the Invention

This disclosure relates to the field of processing items. In particular, this disclosure relates to systems and methods for loading items into a tray.

Description of the Related Art

In many industrial concerns, processing large quantities of items is crucial. For example, many items must be received and handled for sorting, distributing or otherwise processing with various processing equipment. Some operations involve thousands or millions of items handled daily. Items intended for processing or sorting in processing equipment may be received in bundles. Items are typically manually loaded into or unloaded from the processing equipment into trays, which can be time consuming and inefficient.

As an example, mail delivery operations may involve receiving, unloading, transporting and loading thousands of pieces of mail daily into trays for further processing and delivery. The high volume of mail items means more time spent on these and other processes. Poorly designed systems and components that require inconvenient and time intensive movement of items lead to processing inefficiencies with each item that add up to significant losses of time over the course of a day or year.

This is merely one example of an industrial concern that relies on sorting and receiving large quantities of items. Others may include, but are not limited to, retail concerns with large inventories and high daily sales, high volume component manufacturers such as consumer goods, and importing concerns with high volume imports needing sorting and receiving daily.

There is therefore a need for improved systems, devices and methods that allow for efficient and convenient processing of a large volume of items to and from associated processing equipment.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description of Certain Embodiments," one will understand how the features of the embodiments described herein provide advantages over existing systems, devices and methods for receiving items.

In a first aspect, a system for loading items into a tray is disclosed. The system may comprise an item conveyor extending in a first direction toward a first end and configured to move a plurality of items along the item conveyor in the first direction toward the first end and to inject into a tray one or more of the plurality of items from the first end of the item conveyor, a tray conveyor extending generally downward in a second direction that intersects the first direction near the first end of the item conveyor, the tray conveyor configured to move a tray downward on the tray conveyor in the second direction, wherein the tray is configured to receive one or more of the plurality of items injected from the item conveyor, a sensor configured to detect a height of at least one of the plurality of items, and a controller communicatingly coupled with the item conveyor, the tray conveyor and the sensor, wherein the controller is configured to control movement of the item and the tray conveyors based on the height of at least one of the plurality of items detected by the sensor.

In some embodiments, the sensor is positioned above the item conveyor and is configured to detect a height of at least one of the plurality of items on the item conveyor. In some embodiments, the sensor is positioned above the tray conveyor and is configured to detect a height of at least one of the plurality of items in the tray.

In some embodiments, the sensor is positioned above the item conveyor and is configured to detect a height of at least one of the plurality of items on the item conveyor, and the system further comprises a second sensor positioned above the tray conveyor and configured to detect a height of at least one of the plurality of items in the tray.

In some embodiments, the controller is further configured to move the tray conveyor based on the detected height of at least one of the items received in the tray. In some embodiments, the controller is further configured to move the tray conveyor a first amount for a detected increase in height of at least one of the items received in the tray.

In some embodiments, the detected increase in height of the items received in the tray is a cumulative height based on one or more individual measurements of height of at least one of the items in the tray.

In some embodiments, the system further comprises a first detector coupled with the tray conveyor and configured to sense the presence of the tray on the tray conveyor in a starting position. In some embodiments, the system further comprises a second detector coupled with the tray conveyor at an ending position that is upstream from the starting position and configured to sense the absence of the tray from the ending position. In some embodiments, the controller is further configured to control the movement of the tray conveyor based on the sensed presence and absence of the tray on the tray conveyor in the starting and ending positions, respectively. In some embodiments, the first detector senses the presence of a forward portion of the tray at the starting position, and the second detector senses the absence of a rearward portion of the tray at the ending position.

In some embodiments, the controller is configured to move the tray conveyor based on the sensed presence and absence of the tray on the tray conveyor in the starting and ending positions such that a second tray is moved on the tray conveyor in the second direction to the starting position to begin receiving additional items injected from the item conveyor. In some embodiments, the first detector senses the presence of the second tray at the starting position.

In some embodiments, the system further comprises a guide paddle coupled with the controller and positioned generally over the tray conveyor, wherein the controller is further configured to move the guide paddle at least partially into the tray based on the sensed presence of the tray and based on the detected height of at least one of the items received in the tray such that the one or more of the plurality of items injected from the item conveyor deflects off the guide paddle and falls into the tray. In some embodiments, the controller is further configured to extend the guide paddle at least partially into the tray based on the sensed presence of the tray at the starting position, to maintain the position of the guide paddle therein based on the detected height of at least one of the items received in the tray being less than a full height, and to retract the guide paddle out of the tray based on the detected height of at least one of the items received in the tray being greater than or equal to the full height.

In some embodiments, the sensor is configured to sense the height of at least one of the plurality of items in a shingled arrangement on the item conveyor, and the item conveyor is configured to inject the one or more of the plurality of items in the shingled arrangement from the item conveyor.

In some embodiments, the item conveyor has a first section configured to move the plurality of items at a first speed and a second section configured to move the plurality of items at a second speed that is greater than the first speed. In some embodiments, the second speed is approximately twice the first speed. In some embodiments, the first section comprises a low speed conveyor and the second section comprises a high speed injector configured to inject the items from the first end of the item conveyor and inject the items into the tray. In some embodiments, the item conveyor further comprises a third section in between the first and second sections, the third section having a high speed conveyor.

In another aspect, a method of receiving items in a tray is disclosed. The method may comprise moving a plurality of items in a first direction on an item conveyor toward a first end of the item conveyor; injecting one or more of the plurality of items from the item conveyor into a tray on a tray conveyor; detecting a height of at least one of the plurality of items; and moving, based on the detected height of at least one of the plurality of items, the tray downward on the tray conveyor in a second direction that intersects the first direction near the first end of the item conveyor.

In some embodiments, detecting the height of at least one of the plurality of items comprises detecting the height of at least one of the plurality of items on the item conveyor, and moving the items on the item conveyor, injecting the items from the item conveyor, and moving the tray on the tray conveyor are based on the detected height of at least one of the items on the item conveyor.

In some embodiments, detecting the height of at least one of the plurality of items comprises detecting the height of at least one of the plurality of items in the tray on the tray conveyor, and moving the items on the item conveyor, injecting the items from the item conveyor, and moving the tray on the tray conveyor are based on the detected height of at least one of the items in the tray on the tray conveyor.

In some embodiments, detecting the height of at least one of the plurality of items comprises detecting the height of at least one of the plurality of items on the item conveyor; and detecting the height of at least one of the plurality of items in the tray on the tray conveyor, wherein moving the items on the item conveyor, injecting the items from the item conveyor, and moving the tray on the tray conveyor are based on the detected height of at least one of the items on the item conveyor and on the detected height of at least one of the items in the tray.

In some embodiments, the method further comprises sensing the presence or absence of the tray in a starting position.

In some embodiments, the method further comprises moving the tray conveyor a first amount based on detecting the height of at least one of the plurality of items in the tray to be greater than a threshold amount.

In some embodiments, moving the plurality of items in the first direction on the item conveyor comprises moving the plurality of items in the first direction on a first section of the item conveyor at a first speed, and moving the plurality of items in the first direction on a second section of the item conveyor at a second speed that is greater than the first speed. In some embodiments, injecting the one or more of the plurality of items from the item conveyor into the tray comprises injecting the one or more of the plurality of items from the item conveyor into the tray at the second speed.

In some embodiments, the method further comprises guiding the injected items into the tray.

In some embodiments, the method further comprises moving a second tray downward on the tray conveyor in the second direction, and injecting one or more of the plurality of items from the item conveyor into the second tray on the tray conveyor.

In another aspect, a system for loading items into a tray is disclosed. The system may comprise means for moving a plurality of items in a first direction toward a first end of the means for moving the plurality of items, means for moving a tray downward in a second direction that intersects the first direction near the first end of the means for moving the plurality of items, means for injecting one or more of the plurality of items from the means for moving the plurality of items into the tray on the means for moving the tray, and means for detecting a height of at least one of the plurality of items, wherein moving the items, moving the tray and injecting the items are based on the detected height of at least one of the items.

In some embodiments, the means for detecting the height of at least one of the plurality of items comprises means for detecting the height of at least one of the plurality of items on the means for moving the plurality of items, and means for detecting the height of at least one of the plurality of items in the tray on the means for moving the tray, wherein moving the items, moving the tray and injecting the items are based on the detected height of at least one of the items on the means for moving the plurality of items and on the detected height of at least one of the items in the tray.

In some embodiments, the system further comprises means for sensing the presence or absence of the tray in a starting position. In some embodiments, the system further comprises means for moving the tray a first amount based on detecting the height of at least one of the plurality of items in the tray to be greater than a threshold amount. In some embodiments, the system further comprises means for guiding the injected items into the tray.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawing, can be arranged, substituted, combined, and designed in a wide variety of different configurations, all of which are explicitly contemplated and make part of this disclosure.

DETAILED DESCRIPTION

Figure 1A:
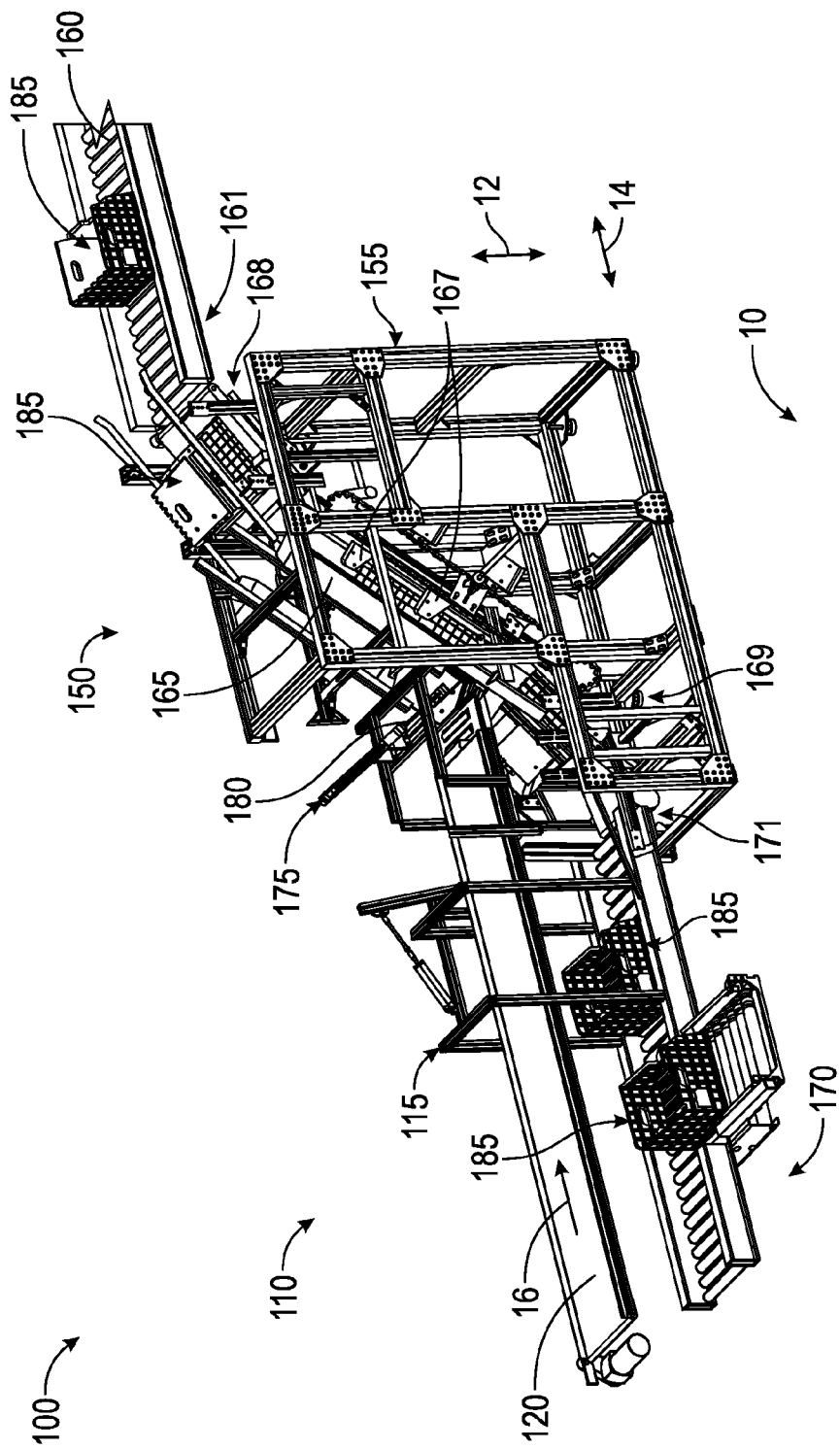
FIG. 1A is a perspective view of an embodiment of a system for loading items into a tray.

The following detailed description is directed to certain specific embodiments of the development. In this description, reference is made to the drawings wherein like parts or steps may be designated with like numerals throughout for clarity. Reference in this specification to "one embodiment," "an embodiment," or "in some embodiments" means that a particular feature, structure, or characteristic described in connection with the embodiment is included in at least one embodiment of the invention. The appearances of the phrases "one embodiment," "an embodiment," or "in some embodiments" in various places in the specification are not necessarily all referring to the same embodiment, nor are separate or alternative embodiments necessarily mutually exclusive of other embodiments. Moreover, various features are described which may be exhibited by some embodiments and not by others. Similarly, various requirements are described which may be requirements for some embodiments but may not be requirements for other embodiments.

Embodiments of the development will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the development. Furthermore, embodiments of the development may include several novel features, no single one of which is solely responsible for its desirable attributes or which is essential to practicing the invention described herein.

In one aspect, systems and methods for loading items into a tray are described. An item conveyor may move the items toward an end of the item conveyor. The items may be moved on the item conveyor in a shingled arrangement, with each item partially overlapping an adjacent item on the item conveyor. A first distance or height sensor may detect the height of or distance to the items as they move on the item conveyor. As used herein, "distance" and "height" may be used interchangeably to refer to the parameter either detected and/or calculated by the sensors or controllers discussed herein. The item conveyor may include a high speed section. The item conveyor may include an injector that injects the items from the end of the item conveyor into a tray that is in a starting position on a tray conveyor. A guide paddle may extend into the tray to defect or otherwise guide the injected items into the tray. The tray conveyor may be vertically oriented at an angle such that the tray moves from the starting position to a lower position on the tray conveyor as it receives items from the item conveyor. A second height sensor may detect the height of the items received inside the tray. The height data detected by the first and second height sensors may be sent to a controller. The controller may control the movement of the item conveyor and/or tray conveyor based on the detected heights. One or more tray sensors may detect the presence or absence of the tray at one or more locations along the length of the tray conveyor. A tray movement sensor such as an encoder may detect and/or track movement of the tray conveyor. When it is determined that the accumulated height of the items in the tray has reached a desired height or limit, and/or when it is determined that the a tray being loaded is detected as absent or present by a sensor, the guide paddle may retract, the item conveyor may temporarily stop injecting items into the tray, and/or the tray conveyor may move the tray on the tray conveyor, for instance in the downward direction. A second tray may then be moved by the tray conveyor to the starting position and the item conveyor may then inject items into the second tray. The system and process may be repeated multiple times for receiving many item in multiple trays.

Figure 1B:
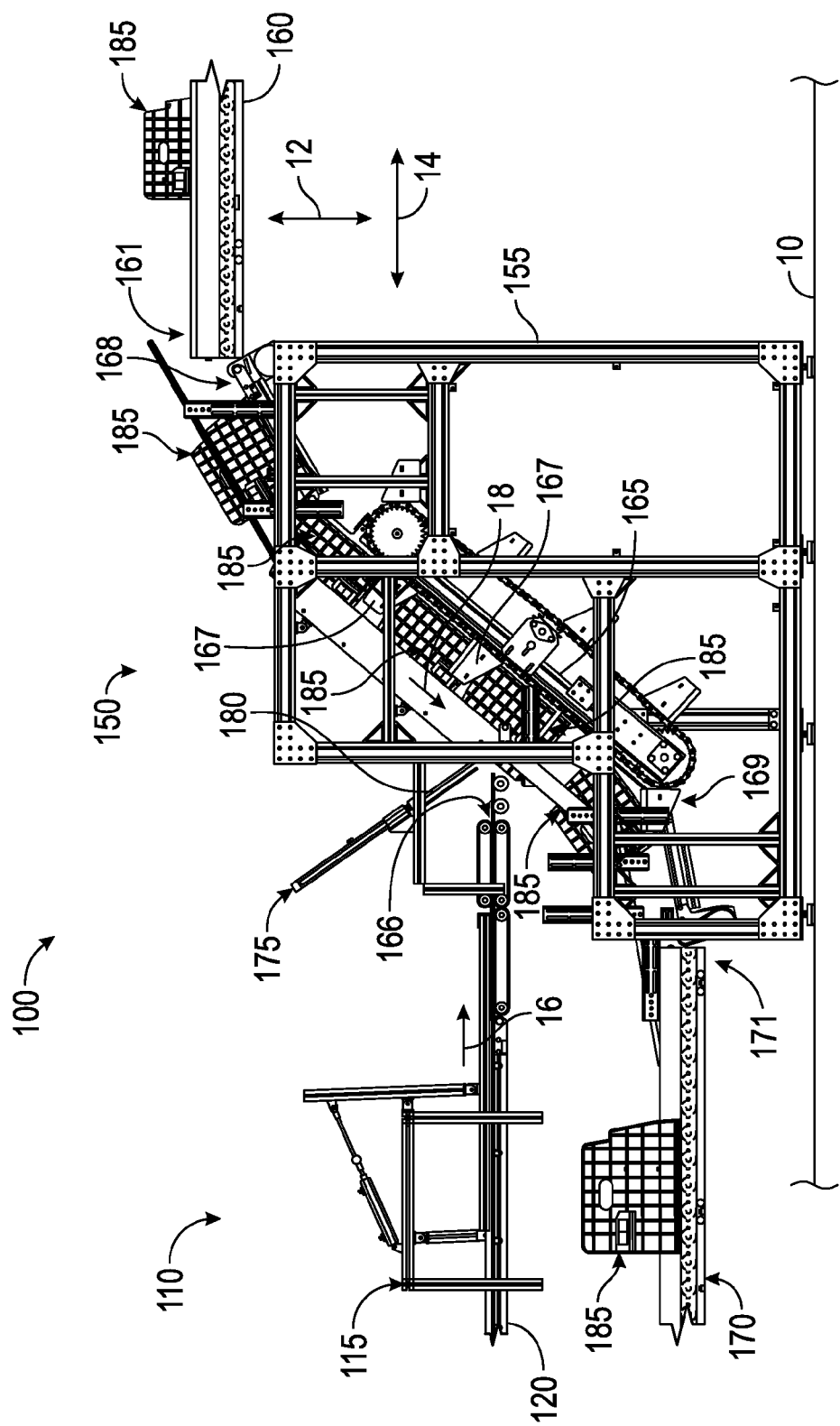
FIG. 1B is a side view of the system of FIG. 1A.

FIG. 1A is a perspective view of a system 100 for processing items, and FIG. 1B is a side view of the system 100. The system 100 may be positioned on the ground 10, which may be a concrete floor or foundation, for example. The system 100 may be described with respect to various geometric references. As shown, the vertical 12 may be a generally up-and-down direction corresponding to the arrow as indicated. The horizontal 14 may be oriented generally side-to-side corresponding to the arrow as indicated. In some embodiments, the horizontal 14 may be generally parallel with the ground 10. In some embodiments, the vertical 12 may be generally perpendicular to the ground 10. Reference to various parts of the system 100 may be made with respect to the vertical 12 and/or the horizontal 14. It is understood that such reference is merely for the sake of description and for clarity, and that such descriptions do not limit the scope of the disclosure herein. Further, it is understood that the vertical 12 and the horizontal 14 are approximate directions, and that suitable deviations therefrom may be implemented for the system 100.

The system 100 may include an item conveyance subsystem 110. The item conveyance subsystem 110 may form a portion of the system 100. The item conveyance subsystem 110 may receive one or more items to be sorted. The item conveyance subsystem 110 may convey the items to a tray conveyance subsystem 150 for receipt of the items in one or more trays.

The item conveyance subsystem 110 may include an item conveyor support 115. The item conveyor support 115 may support the item conveyance subsystem 110. The item conveyor support 115 may support a conveyor. The item conveyor support 115 may be formed of a metal support frame which attaches to the ground 10 and holds the item conveyance subsystem 110 in place. The item conveyor support 115 may include multiple elongated members mechanically attached to each other. The item conveyor support 115 may be bolted to the ground 10 or attached in any other suitable manner. The item conveyor support 115 may be bolted or otherwise mechanically attached to a conveyor in order to support the conveyor.

The item conveyance subsystem 110 may include an item conveyor 120. The item conveyor 120 may convey or otherwise move the items along the item conveyor 120, for example along a belt or other moving surface of the item conveyor 120, as described herein. The item conveyor 120 may be oriented generally horizontally along a feed direction 16. The feed direction 16 may be the direction in which the items are conveyed along the item conveyor 120. The feed direction 16 may be aligned with the horizontal 14. In some embodiments, the feed direction 16 may not be exactly aligned with the horizontal 14. Further detail of the item conveyor 120 is discussed herein, for example, with respect to FIG. 2.

The item conveyor 120 may include a first end 166. The first end 166 may be an end of the item conveyor 120 toward which the items are moved. The items may be propelled or otherwise moved from the item conveyor 120 across the first end 166 toward a tray conveyor, which is described in further detail herein.

The system 100 may include a tray conveyance subsystem 150. The tray conveyance subsystem 150 may form a portion of the system 100. The tray conveyance subsystem 150 may be located adjacent the item conveyance subsystem 110. The tray conveyance subsystem 150 may convey one or more trays in which the items may be received from the item conveyance subsystem 110.

The tray conveyance subsystem 150 may include a tray conveyor support 155. The tray conveyor support 155 may be a metallic frame formed from multiple elongated metallic members mechanically attached with each other and to the ground 10. The support 155 may be bolted together or attached in any suitable manner. The tray conveyor support 155 may hold and support one or more tray conveyors, such as an upper tray conveyor 160, a tray conveyor 165, and/or a lower tray conveyor 170.

The tray conveyance subsystem 150 may include the upper tray conveyor 160. The upper tray conveyor 160 may be attached to and supported by the tray conveyor support 155 as shown. In some embodiments, the upper tray conveyor 160 may be supported by its own frame separate from the tray conveyor support 155. The upper tray conveyor 160 may be oriented generally in the horizontal 14 direction. The upper tray conveyor 160 may be located relatively higher in the vertical 12 direction compared to the item conveyor 120. The upper tray conveyor 160 may move one or more trays along the conveyor 160. The trays moved on the upper tray conveyor 160 may be empty in order to receive items therein. As shown, the upper tray conveyor 160 may be passive such that trays on the conveyor 160 move on rotating rolling bars as the trays are placed onto the conveyor 160. In some embodiments, the upper tray conveyor 160 may be actuated such that the upper tray conveyor 160 actively moves the trays along the conveyor 160.

The tray conveyance subsystem 150 may include the tray conveyor 165. The tray conveyor 165 may be attached to and supported by the tray conveyor support 155. The tray conveyor 165 may be located adjacent the upper tray conveyor 160. As shown, one end of the tray conveyor 165 may be located adjacent or otherwise near an end of the upper tray conveyor 160. The tray conveyor 165 may receive trays thereon from the upper tray conveyor 160. In some embodiments, an end 168 of the tray conveyor 165 may be attached to an end 161 of the upper tray conveyor 160. The two ends 161, 168 may be attached together via an intermediate conveyor in between the two ends 161, 168. In some embodiments, the two ends 161, 168 may be directly attached together. The tray conveyor 165 may extend in a tray direction 18 as indicated by the arrow. The tray conveyor 165 may extend from a location near an end of the upper tray conveyor 160 in the tray direction 18. The tray direction 18 may extend in an angled, downward direction with respect to the upper tray conveyor 160. The tray direction 18 may extend partially downward in the vertical 12 direction and partially toward the lower tray conveyor 170 in the horizontal 14 direction. The tray direction 18 may be oriented at a range of angles with respect to the vertical 12. In some embodiments, the tray direction 18 may form an angle in the range of thirty to sixty degrees with the vertical 12. In some embodiments, the tray direction 18 may form an angle of other larger or smaller angular amounts with respect to the vertical 12. In some embodiments, the tray direction 18 may form an angle of forty degrees with the vertical 12. In some embodiments, the tray direction 18 may form an angle of fifty degrees with the vertical 12. The tray direction 18 may intersect the feed direction 16. Thus, a portion of the tray conveyor 165 may be higher than the item conveyor 120, and a portion of the tray conveyor 165 may be lower than the item conveyor 120. The tray conveyor 165 may move one or more trays in the tray direction 18 along the tray conveyor 165 in order to receive items in the trays from the first end 166 of the item conveyor 120. The tray conveyor 165 may be controllably actuated to move the trays in response to receiving items in the trays, which is described in further detail herein.

The tray conveyor 165 may include one or more tray catches 167. The tray catches 167 may be structural members that support the trays on the tray conveyor 165. The tray catches 167 may be structural members that move with the tray conveyor 165. As the tray conveyor 165 moves, the tray catches 167 may move along with the trays 185 on the tray conveyor 165. In some embodiments, one or more tray catches 167 may secure one of the trays 185 on the tray conveyor 165 to prevent the tray 185 from sliding down the tray conveyor 165. The tray catches 167 may be spaced along the length of the tray conveyor 165 to secure the trays 185 at a relative distance from each other as they mover on the tray conveyor 165. The tray catches 167 may be brackets or other suitable members or devices that can secure the tray 185 in place. In some embodiments, the tray catches 167 may be planar structures such as fins located along the sides of the tray conveyor 165 and extending upward therefrom and having a lip that extends inward on the tray conveyor 165 to receive and secure the tray 185 in place.

The tray conveyance subsystem 150 may include the lower tray conveyor 170. The lower tray conveyor 170 may be attached to and supported by the tray conveyor support 155. The lower tray conveyor 170 may be oriented generally in the horizontal 14 direction. The lower tray conveyor 170 may be located relatively lower in the vertical 12 direction as compared with the item conveyor 120. The lower tray conveyor 170 may be located adjacent the tray conveyor 165. As shown, an end 171 of the lower tray conveyor 170 may be located adjacent or otherwise near a lower end 169 of the tray conveyor 165. The end 171 of the lower tray conveyor 170 may be attached to the lower end 169 of the tray conveyor 165 via an intermediate conveyor. In some embodiments, the end 171 of the lower tray conveyor 170 may be directly attached to the lower end 169 of the tray conveyor 165. The lower tray conveyor 170 may extend from a location near a lower end of the tray conveyor 165. The lower tray conveyor 170 may receive one or more trays 185 from the tray conveyor 165 after the trays 185 have received the items. As shown, the lower tray conveyor 170 may be passive such that trays on the conveyor 170 move on rotating rolling bars as the trays are received onto the conveyor 170. In some embodiments, the lower tray conveyor 170 may be actuated such that the lower tray conveyor 170 actively moves the trays along the conveyor 170.

The trays 185 may be receptacles that receive the items and hold the items therein. The trays 185 may be moved by the tray conveyance subsystem 150. There may be multiple trays 185 on the tray conveyance subsystem 150. The trays 185 may be empty, partially full with items, or full with items. The trays 185 may be empty as they are moved along the upper tray conveyor 160. The trays 185 may then move from the upper tray conveyor 160 and onto the tray conveyor 165. The tray conveyor 165 may move the trays 185 in the tray direction 18 and into a position or positions to receive items from the item conveyance subsystem 110. The tray conveyor 165 may then controllably move the trays 185 in the tray direction 18 as they receive the items. When the trays 185 are full or partially full, the trays 185 may be moved by the tray conveyor 165 in the tray direction 18 to the lower tray conveyor 170. The lower tray conveyor 170 may receive the trays 185 and move the trays 185 thereon for further processing of the items in the trays 185.

The system 100 may include a paddle support 175. The paddle support 175 may be a metallic frame formed of elongated metallic members mechanically attached to each other. The paddle support 175 may be a supporting structure attached to the tray conveyor support 155 as shown. In some embodiments, the paddle support 175 may be attached with its own supporting structure separate or with other supporting structures, such as the item conveyor support 115, for example. The paddle support 175 may support features for guiding the items as they are moved from the item conveyance subsystem 110 to the tray conveyance subsystem 150. The paddle support 175 may include movable components to move the guiding features, such as moving a guide paddle 180. In some embodiments, the paddle support may include a pneumatic actuator that moves the guide paddle 180. For example, the guide paddle 180 may be connected with a slide rod of a pneumatic actuator. The pneumatic actuator may be connected with the paddle support 175.

The guide paddle 180 may be supported by the paddle support 175. The guide paddle 180 may be mechanically attached to the guide support 175 such that the support 175 may move the paddle 180. The guide paddle 180 may provide a structure for guiding items as they move from the item conveyance subsystem 110 to the tray conveyance subsystem 150. In some embodiments, the guide paddle 180 may be a generally planar structure. In some embodiments, the guide paddle 180 may be formed with openings therein to form forks, tines or other like features. In some embodiments, the items may deflect off the guide paddle 180 as the items move from the item conveyor 120 and into the trays 185. The guide paddle 180 may be moved into and out of the trays 185 by the paddle support 175. Further detail of the guide paddle is discussed herein, for example, with respect to FIG. 2 and FIG. 9.

Figure 2:
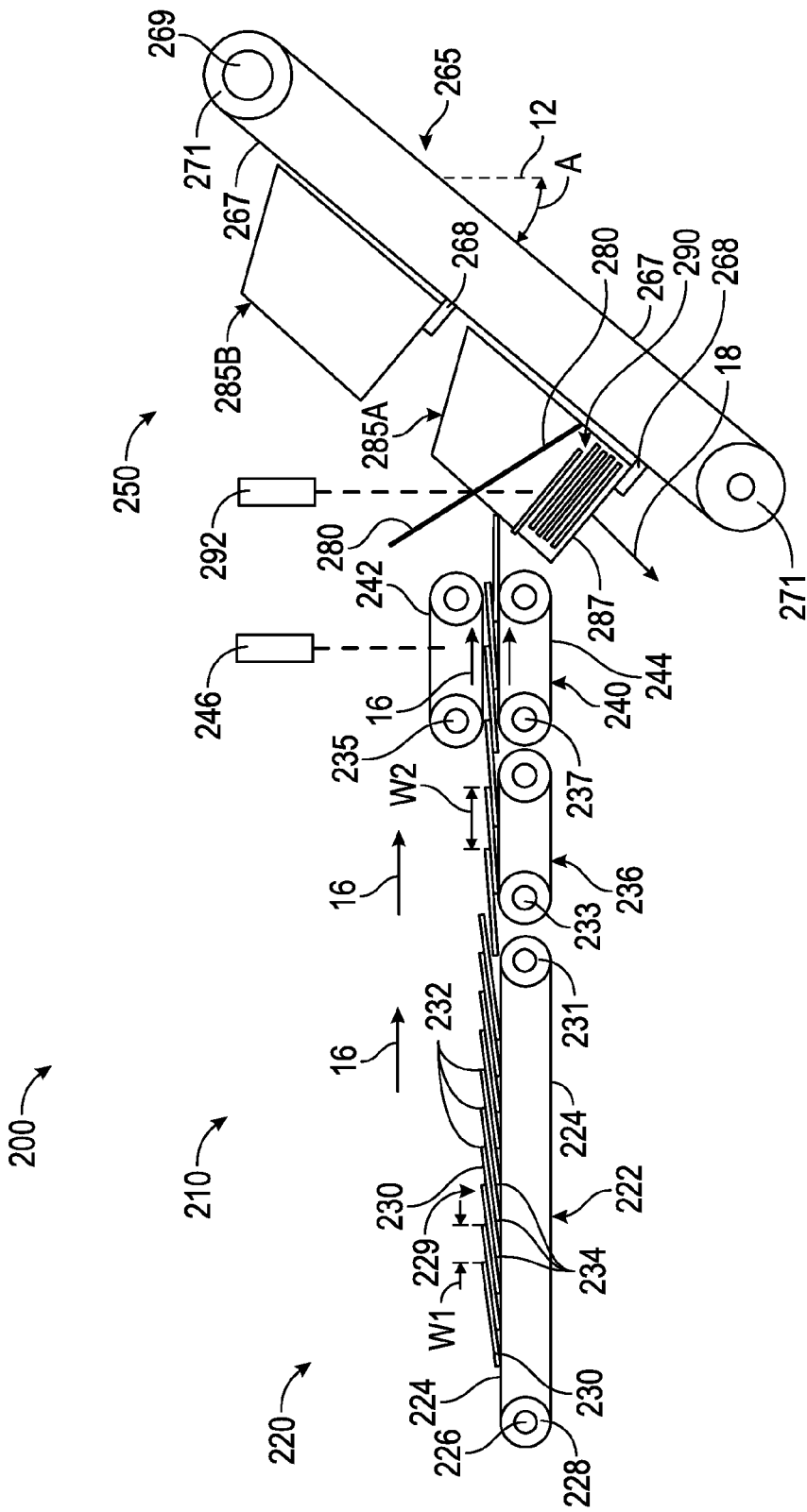
FIG. 2 is a side view of another embodiment of a system for loading items into a tray.

FIG. 2 is a side view of an embodiment of a system 200 for loading one or more items 230 into a tray. The system 200 may have the same or similar features as other systems described herein, for example the system 100, and vice versa. As shown in FIG. 2, the system 200 may include an item conveyance subsystem 210. The item conveyance subsystem 210 may have the same or similar features as the item conveyance subsystem 110, and vice versa. The item conveyance subsystem 210 may include an item conveyor 220, which may have the same or similar features as the item conveyor 120, and vice versa.

The system 200 may be used for processing and/or loading one or more items 230 into one or more trays. The items 230 may be received in a variety of configurations. In some embodiments, the items 230 may be received in bundles. The items 230 may be pre-processed for introduction into the system 200. In some embodiments, bundles of the items 230 may be broken down into other configurations, such as a shingled arrangement. The items 230 may be objects that require loading one or more of the items 230 into discrete carrying containers, such as the trays 285. The items 230 may be generally planar and/or rectangular shaped. In some embodiments, the items 230 maybe flat mail pieces. The items 230 may be rigid or flexible. The items 230 may be about 9.5 inches long by about 6 inches wide by about 0.04 inches thick. The items 230 may be about 11 inches long by about 8 inches wide by about 0.1 inches thick. The items 230 may be about 5 inches wide by about 6 inches long. The items 230 may be about 11 inches wide by about 15 inches long. The items 230 may be about 0.5 inches thick. These are merely some examples, and other suitable items 230 having a variety of shapes and sizes may be processed with the system 200.

The item conveyor 220 may move one or more of the items 230. The items 230 may be conveyed along the item conveyor 220 and into the trays. As shown, the items 230 may be in a shingled arrangement 229 on the item conveyor 220. The shingled arrangement 229 of the items 230 may include the items 230 arranged such that a portion of a first item 230 partially overlaps a portion of an adjacent items 230. As shown, the items 230 may include a leading edge 232 that rests on an adjacent item 230. The items 230 may also include a trailing edge 234 which rests below an adjacent item 230. Therefore, the shingled arrangement 229 may include the leading edge 232 of the item 230 resting on the adjacent item 230 in front and the trailing edge 234 resting below the adjacent item 230 behind. In some embodiments, the leading edge 232 may be the bonding edge, for example of a mail item.

The items 230 may be conveyed on a belt 224 of the item conveyor 220. The belt 224 may form an elongated structure configured to be mounted with or on various structures for movement of the belt 224. The belt 224 may move the items 230 along the item conveyor 220 in the feed direction 16. The belt 224 may be formed of rubber or other suitable materials.

The belt 224 may be moved by an item actuator 226. The item actuator 226 may be a part of the item conveyor 220. The item actuator 226 may actuate or otherwise move the item conveyor 220 such that the items 230 may be moved thereon. As shown, the item actuator 226 may be coupled with the belt 224 such that the belt 224 is moved by the item actuator 226. The item actuator 226 may be a motor, or a wheel such as a roller connected to a motor, or any other suitable device for moving the belt 224. The item actuator 226 may be operated at various speeds to control the speed of the item conveyor 220. There may be multiple item actuators 226. In some embodiments, there may be multiple item actuators 226 operating at different speeds to control various sections of the item conveyor 220. The item actuator 226 is shown on one end of the item conveyor 220. The item actuator 226 may be located on the other end of the item conveyor 220, at both ends of the item conveyor 220, or at a location or locations in between the two ends of the item conveyor 220.

The item actuator 226 may move one or more rollers 228, such as a wheel. The item conveyor 220 may have a first roller 228 on one end and a second roller 231 on the opposite end. One or both of the rollers 228, 231 may be moved, e.g. rotated, by the item actuator 226. The rollers 228, 231 may have the belt 224 wrapped thereon. The item actuator 226 may rotate the first roller 228, which may rotate the belt 224, which may rotate the second roller 231. In some embodiments, the item actuator 226 may be located on the opposite end of the item conveyor 220 such that it rotates the second roller 231 which may rotate the belt 224, which may rotate the first roller 228. In some embodiments, a chain may be used to transmit the moving force to the various moving parts. For example, the item actuator 226 may be connected to a chain that is also connected to the first and/or second rollers 228, 231, such that movement of the item actuator 226 may move the first and/or second rollers 228, 231, which may move the conveyor belt 224. Therefore, in a variety of suitable manners, actuation of the item actuator 226 may move the belt 224 such that the items 230 are moved in the feed direction 16 along the item conveyor 220.

The item conveyor 220 may include a low-speed section 222. The low-speed section 222 may include the belt 224, the item actuator 226 and/or the rollers 228, 231. The belt 224 may therefore be a low speed buffer belt. The low-speed section 222 may be actuated by one or more of the item actuators 226. The low-speed section may move at a relatively slower speed compared to other sections of the item conveyor 220, such as a high-speed section 236 described in further detail herein. In some embodiments, the low-speed section 222 may move at a speed of one foot per second (1 ft/sec). The items 230 in the shingled arrangement 229 on the low-speed section 222 may be oriented such that the leading edges 232 of adjacent items 230 are a distance W1 from each other. In some embodiments, the distance W1 may be about two inches.

The item conveyor 220 may include a high-speed section 236. The high-speed section 236 may include a belt and/or actuator 233, which may be similar to the belt 224 and/or the item actuator 226, respectively. The high-speed section 236 may be located adjacent the low-speed section 222. The items 230 may be conveyed from the low-speed section 222 to the high-speed section 236. The high-speed section 236 may move the items 230 thereon at a relatively faster speed compared to the low-speed section 222. The high-speed section 236 may also be actuated by one or more item actuators, such as the high speed actuator 233. The high speed actuator 233 may the same or similar features as the actuator 226. The high-speed section 236 may convey the items 230 in the feed direction 16. The items 230 may be conveyed on the high-speed section 236 at a speed that is greater than that of the low-speed section 222. In some embodiments, the high-speed section 236 may convey the items 230 at a speed that is twice that of the low-speed section 222, i.e. about two feet per second (2 ft/sec). This is merely one example and the items may be conveyed at various other speeds. In some embodiments, the items may be conveyed along the high-speed section 236 at a speed that is 1.5, 2.5, 3 times or more the speed of the low-speed section 222.

The items 230 may be conveyed in the shingled arrangement 229 from the low-speed section 222 to the high-speed section 236. At the high-speed section 236, the items 230 may still be in the shingled arrangement 229 but with different spacing in between the leading edges of adjacent items 230. The items 230 at the high-speed section 236 may be spread further apart relative to each other as compared with the low-speed section 222. As shown, the leading edges 232 of adjacent items 230 on the high-speed section 236 may be at a distance W2 from each other. W2 may be greater than W1. In some embodiments, W2 may be about four inches.

The item conveyor 220 may include an injector 240. The injector 240 may be located adjacent to the high-speed section 236. The injector 240 may receive the items 230 from the high-speed section 236. The injector 240 may include a top belt 242 and a bottom belt 244. The top belt 242 and the bottom belt 244 are disposed relative to each other to sandwich the items 230 in between the two belts 242, 244. The top and bottom belts 242, 244 may be moving such that the items 230 are conveyed in the feed direction 16. The belts 242 and 244 may be moved by actuators 235 and 237, respectively. The actuators 235, 237 may have the same or similar features as the actuators 226 and/or 233. The injector 240 may convey the items 230 at a speed that is about twice that of the low-speed section 222. Thus, the injector 240 may convey the items 230 at approximately the same or similar speed as the high-speed section 236. The injector 240 may propel the items 230 from the item conveyance subsystem 210 to a tray conveyance subsystem. As shown, the injector 240 may propel the items 230 from the item conveyor 220 into a tray on the tray conveyance subsystem.

The item conveyance subsystem 210 may include an item sensor 246. The item sensor 246 may be a distance detector that measures or otherwise detects the distance to the items 230 on the item conveyor 220. As used herein, "distance" may be used interchangeably with "height," and both terms include any detected or measured distance or height to or of an item of interest. The item sensor 246 may be any suitable distance detector. In some embodiments, the item sensor 246 may be a laser sensor. The item sensor 246 may be a short-range, mid-range, or long-range distance detector. The item sensor 246 may be an ultrasonic sensor, an optical linear measurement (OLM) sensor, an optical sensor, an optoelectronic sensor, a photoelectric sensor, a capacitive sensor, an infrared (IR) sensor. These sensors are exemplary only, and other suitable sensors may be implemented.

As shown, the item sensor 246 may be positioned generally above the item conveyor 220. The item sensor 246 may be supported by the item conveyor support 115 (see FIG. 1A and FIG. 1B). The item sensor 246 may be positioned generally above the injector 240. In some embodiments, the item sensor 246 may be positioned above other portions of the item conveyor 220, such as above the high-speed section 236 or above the low-speed section 222. The item sensor 246 may detect the height of the items 230 in the shingled arrangement 229. The data received on the height of the items 230 may then be used to control the system 200. As is discussed in further detail herein, for example with respect to FIG. 3, the height data gathered with the item sensor 246 may be used to control the movement or speed of the item conveyor 220.

Further shown in FIG. 2 is a tray conveyance subsystem 250. The tray conveyance subsystem 250 may have the same or similar features as the tray conveyance subsystem 150. The tray conveyance subsystem 250 may receive the items 230 from the item conveyance subsystem 210.

The tray conveyance subsystem 250 may include a tray conveyor 265. The tray conveyor 265 may have the same or similar features as the tray conveyor 165, and vice versa. The tray conveyor 265 may be oriented at an angle A with respect to the vertical 12. In some embodiments, the angle A may be about forty degrees. The tray conveyor 265 may include a belt 267. The belt 267 may be a generally elongated structure configured to move one or more trays thereon. The belt 267 may be formed from the same or similar materials as the belt 224. In some embodiments, the belt 267 may be formed of rubber, polymer, plastic, or other suitable materials or combinations thereof.

The belt 267 may be wrapped around two or more wheels 271. The wheels 271 may be rollers, and they have the same or similar features as the other wheels and rollers described herein, for example rollers 228, 231 or others. As shown, the belt 267 may be wrapped around a first wheel 271 at one end and a second wheel 271 at an opposite end. The wheels 271 may be generally circular structures configured to move and thereby rotate the belt 267. One or more of the wheels 271 may be coupled with a tray actuator 269. The tray actuator 269 may have the same or similar features as the item actuator 226. The tray actuator 269 may therefore be a motor or other device that causes rotation of the wheel 271. Therefore, actuation of the tray actuator 269 may move the wheel 271 which may then move the belt 267. The tray actuator 269 may be rotated or otherwise actuated at various speeds. The tray actuator 269 may move the belt 267 at variable speeds or at intervals based on height data collected by height sensors 246, 292.

The tray conveyor 265 may include one or more tray catches 268. The tray catches 268 may have the same or similar features as the tray catch 167. The tray catch 268 may be coupled with the belt 267. As the belt 267 moves, the tray catches 268 may move with the belt such that the trays 285A, 285B are secured in place while the trays 285A, 285B move. As shown, the tray catches 268 may be located generally near the forward portions of the trays 285A, 285B in order to prevent the trays 285A, 285B from sliding down the tray conveyor 265.

The tray conveyance subsystem 250 may include one or more trays. As shown, the tray conveyance subsystem 250 may include a first tray 285A and a second tray 285B. The trays 285A, 285B may be conveyed in a tray direction 18 on the tray conveyor 265. The first and second trays 285A, 285B may have the same or similar features as the trays 185. The first tray 285A may be farther along the tray conveyor belt 267 the second tray 285B, as shown. The first tray 285A may be positioned to receive the items 230 from the item conveyance subsystem 210. As shown, the first tray 285A may be located in a position that intersects the feed direction 16. The first tray 285A may therefore be located such that it receives the items 230 propelled from the injector 240. The items 230 may be propelled or otherwise moved from the injector 240 through the air, impinge on the guide paddle 280, and fall into the first tray 285A.

The items 230 received inside the first tray 285A may form a stack 290. As shown, the stack 290 of items 230 may rest on a side of the first tray 285A. The stack 290 may be oriented in an angled direction with respect to the horizontal direction, which may correspond approximately to the angle of tilt of the tray 285. Thus, the stack 290 may extend in a direction that is not aligned with the vertical direction. The stack 290 may be resting on various portions of the tray 285, such as a front sidewall, for example the front sidewall 287 of the first tray 285A. The stack 290 may be resting on a front or rear sidewall of a tray, for example the front or rear sidewalls 787, 788 of the tray 785, described herein with respect to FIG. 7 The stack may be justified to one side of the tray, such as the left sidewall 789 or right sidewall 790 of the tray 785, for example. In some embodiments, the items 230 maybe flat mail pieces with four edges. The flat mail pieces may be resting on their flat side on the front sidewall 287 of the tray 285. The edges of the items 230 may be contacting other walls of the tray 285. In some embodiments, the items 230 may be flat mail pieces with edges contacting one or more other walls of the tray 285. The items 230 in the stack 290 may or may not be aligned with each other, such that one item 230 may be contacting various sides of the tray and the adjacent items 230 may be contacting other sides of the tray.

The tray conveyance subsystem 250 may include a stack sensor 292. The stack sensor 292 may have the same or similar features as the item sensor 246. The stack sensor 292 may be located above the tray conveyor 265. As shown, the stack sensor 292 may be located generally above the position where the first tray 285A is located. The stack sensor 292 may be supported in place by the tray conveyor support 155 (see FIG. 1A and FIG. 1B). As shown, the stack sensor 292 may detect the height of the items 230 in the first tray 285A. In some embodiments, the sensor 292 may detect the distance to the items 230 and calculate the height of the items 230 based on the detected distance. Thus, the stack sensor 292 may detect the height of the stack 290 inside the first tray 285A. Further, before the any items 230 are received into the first tray 285A, the stack sensor 292 may detect the distance to the first tray 285A. In some embodiments, the stack sensor 292 may detect the distance to a sidewall of the first tray 285A, such as the front sidewall 287A. The stack sensor 292 may detect the distance to an inside surface of the sidewall. The stack sensor 292 may use laser or other suitable means for detecting the height of the stack 290. The stack sensor 292 may be oriented such that it detects the height of the stack 290 in the vertical 12 direction. However, the stack center 292 need not be oriented exactly vertical.

The system 200 may include a guide paddle 280. The guide paddle 280 may have the same or similar features as the guide paddle 180. The guide paddle 280 may be a generally planar structure configured to guide the items 230 from the item conveyance subsystem 210 to the tray conveyance subsystem 250. As shown, the guide paddle 280 may guide the items 230 conveyed from the item conveyor 220 into the first tray 285A on the tray conveyor 265. The guide paddle 280 may be moveable such that it may extend from an original position to an extended position and then retract from the extended position to the original position. The guide paddle 280 is shown in FIG. 2 extending into the first tray 285A. With the guide paddle 280 extended into the tray 285A, the items 230 may be propelled from the injector 240 and deflect off of the guide paddle 280 and then settle into the first tray 285A. The items 230 may deflect off the guide paddle 280 such that they form the stack 290 on the front sidewall 287 of the first tray 285A. After the stack 290 has reached a desired height, which may be determined based on height data from the stack sensor 292 and/or the item sensor 246, the guide paddle 280 may be retracted out of the first tray 285A. Retraction of the guide paddle 280 may instead or in addition be based on position of the tray 285A, for example as determined by one or more tray movement sensors 894, 895, described in further detail herein, for instance with respect to FIGS. 8A-8D. The sensor 292 may communicate with a controller or other processor which controls the actuator 269 or other actuators, as described in further detail herein. After the stack 290 has reached the desired height and the guide paddle 280 has been retracted out of the first tray 285A, the first tray 285A, along with the second tray 285B, may then be conveyed along the tray conveyor 265 in the tray direction 18. In some embodiments, the first tray 285A, along with the second tray 285B, may begin to move along the tray conveyor 265 before the first tray 285A has a desired height of the stack 290 of items and/or before the guide paddle 280 is fully retracted out of the first tray 285A.

The second tray 285B may be conveyed along the tray conveyor 265 in the tray direction 18 to the same location at which the first tray 285A was located when the first tray 285A began receiving items 230. The second tray 285B may then receive items 230 injected from the item conveyor 220, and once a stack of items 230 inside the second tray 285B reaches a desired height, the tray 285B may be moved along the tray conveyor 265 in the tray direction 18 in a similar manner as the first tray 285A. A third tray (not shown) may then be moved along the tray conveyor 265 to a position from which it can then begin receiving items 230, and the process can continue for multiple further trays.

The timing of the movement of the trays on the tray conveyor 265 may be determined based on analysis of the height data collected with the various height sensors. The trays may be moved along the tray conveyor 265 soon after the desired height of the items 230 in the tray is detected, calculated, or otherwise determined based on data collected with the various height sensors. In this manner, multiple trays 285 may receive the items 230 and efficiently be conveyed along the tray conveyor 265. Such processing may be controlled with a system having a controller that controls movement of the various conveyors based on detected height data, as is discussed in further detail herein, for example with respect to FIG. 3. In some embodiments, the time from the tray 285A beginning to receive the items 230 to the time the tray 285A is filled with items 230 to a desired height may be about fifteen seconds (15 sec.). In some embodiments, the time from the tray 285A beginning to receive the items 230 to the time the tray 285A is filled with items 230 to a desired height may be about eight seconds (8 sec.). In some embodiments, a single cycle of the processing of the items 230 into a tray may be about twenty to twenty-five seconds (20-25 sec.). A single cycle may be the time in between the first tray 285A and the second tray 285B moving into a starting position to begin receiving the items 230, as is discussed in further detail herein, for example with respect to FIG. 8. Thus a single tray may be quickly and efficiently filled with items and moved along so that many trays can be quickly and efficiently filled and processed. In some embodiments, tens, hundreds, thousands, tens of thousands, hundreds of thousands, millions, or any lower, intermediate or higher number of trays may be conveyed along the tray conveyor 265 and filled with a desired height of items 230. In some embodiments, about fifty thousand (50,000) trays may be conveyed along the tray conveyor 265 and filled with a desired height of items 230 in a twenty-four hour or full day period. These are merely some examples of the capabilities of the various systems described herein, such as the system 200, and other capabilities not explicitly mentioned herein may be within the scope of the disclosure.

Figure 3:
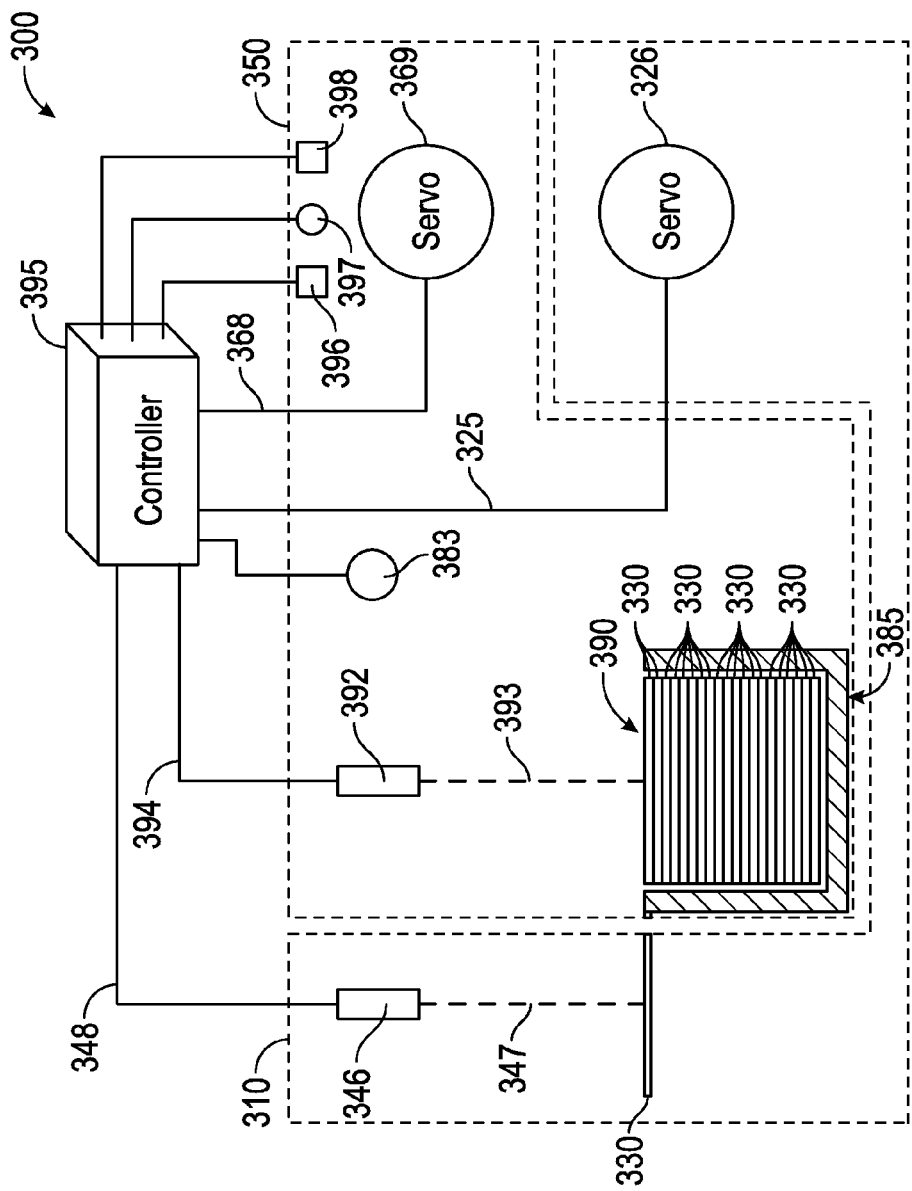
FIG. 3 is a schematic of another embodiment of a system for loading items into a tray.

FIG. 3 is a schematic of a system 300 for efficiently processing large quantities of items 330. The system 300 may use data indicative of, or otherwise related to, the height of the items 330 at various stages of the system 300 in order to control certain characteristics of various actuators, such as actuators that control tray movement, or other actuators. The data related to the height of the items may be used by the system 300 to determine when a tray contains a sufficient volume and/or quantity of items in order to control the speed of various actuators. The system 300 may include various actuators in mechanical communication with various conveyors, or belts thereon, in order to control the movement of items and trays in a synchronized manner to efficiently process large numbers of items into the trays. The system 300 may have the same or similar features as the other systems for processing items described herein, for example the system 100 or 200, and vice versa. In some embodiments, the system 300 may be used to control the other systems for processing items described herein, for example the system 100 or 200.

The system 300 may include an item sensor 346, a stack sensor 392, a guide paddle actuator 383, a controller 395, an item actuator 326, a tray actuator 369, tray movement sensors 396, 398, and/or a conveyor movement sensor 397. The item sensor 346 may be used to detect the distance to an object or objects of interest. The item sensor 346 may have the same or similar features as other item sensors described herein, such as the item sensor 146 or 246. The item sensor 346 may transmit a transmission 347 toward one or more items 330 to detect the distance to the one or more items 330. The items 330 may have the same or similar features as other items described herein, such as the items 130 or 230. The items 330 may be moving on an item conveyor (not shown), such as the item conveyor 120 or 220, to be injected into one or more trays 385. The transmission 347 may be transmitted electromagnetic energy that may reflect off of the one or more items 230. In some embodiments, the transmission 347 is directed onto one of the items 330 and reflects back toward the item sensor 346. The timing in between transmitting the transmission 347 and receiving the reflected transmission 347 may be used to determine the distance from the item sensor 346 to the item 330.

The item sensor 346 may send information related to the distance to the item 330 along an item sensor line 348. The item sensor line 348 may allow for such information to be sent from the item sensor 346 to a controller 395 to control various actuators of the system 300. The item sensor 346 may send raw data along the item sensor line 348. In some embodiments, the item sensor 346 may perform preprocessing on the data or signals before they are sent along the item sensor line 348. In some embodiments, the controller 395 may instead or in addition perform processing of the data or signals. Although the item sensor line 348 is shown as a physical connection between the item sensor 346 to a controller, the item sensor line 348 in some embodiments may be a wireless transmission. Any suitable wireless communication means may be used, such as Bluetooth, RF, other near field communication (NFC) devices, or others. The item sensor line 348 therefore is merely indicative of a communicating connection between the item sensor 346 and the controller. In some embodiments, there may be a transmitter (not shown), in communicating connection with the item sensor 346, that transmits a wireless signal indicative of the height data of the item sensor 346 to a receiver (not shown), in communicating connection with a controller, that receives the data and/or signal to be used by the controller.

The system 300 may be used for processing the one or more items 330 into one or more trays 385. A partial side cross-section view of one of the trays 385 having multiple items 330 therein is shown in FIG. 3. The tray 385 may be moving on a tray conveyor (not shown), such as the tray conveyor 165 or 265. The tray 385 may have the same or similar features as other trays described herein, such as the tray 185, 285A or 285B. As shown, the tray 385 may receive multiple items 330 therein. The items 330 may be injected into the tray 385, such as with the injector 240 (not shown). The tray 385 may receive the items 330 therein such that multiple items 330 form a stack 390 in the tray 385. The stack 390 may be multiple items 330 resting one on top of another. The stack 390 may have the same or similar features as other stacks described herein, such as the stack 290.

The system 300 may include one or more of the stack sensors 392. The stack sensor 392 may have the same or similar features as other stack sensors described herein, for example the stack sensor 292. The stack sensor 392 may be the same or similar distance detectors as described with respect to the item sensor 346. In some embodiments, the stack sensor 392 may be a similar type of distance detector as the item sensor 346. In some embodiments, the stack sensor 392 may be a different type of distance detector than that of the item sensor 346. The stack sensor 392 may transmit a transmission 393, such as electromagnetic energy, toward the stack 390 of items 330. The transmission 393 may reflect off the top item 330 of the stack 390 and be sent back toward the stack sensor 392 to be received by the stack sensor 392. The stack sensor 392 may use the timing between transmitting the transmission 393 and receiving the reflected transmission 393 to determine the distance to the stack 390. This distance may be indicative of the height of the stack 390 in the tray 385.

The stack sensor 392 may send data or information related to the height of the stack 390 along a stack sensor line 394. Such data may be sent along the stack sensor line 394 to a controller. The stack sensor line 394 may have the same or similar features as the item sensor line 348, and vice versa. In some embodiments, the stack sensor line 394 is a wired communication connection between the stack sensor 392 and a controller. In some embodiments, the stack sensor line 394 is a wireless communication connection between the stack sensor 392 and the controller 395. The stack sensor 392 may send raw data related to the height of the stack 390 along the stack sensor line 394. In some embodiments, the stack sensor 392 may perform preprocessing, calculations, computations, or other operations or analysis on the data before sending it along the stack sensor line 394. In some embodiments, the controller 395 may instead or in addition perform processing of the data or signals.

The system 300 may include an item actuator line 325 and the actuator 326. The item actuator line 325 may have the same or similar features as the item sensor line 348 or the stack sensor line 394. The item actuator 326 may have the same or similar features as other item actuators described herein, such as the item actuator 226. The item actuator line 325 may provide a communicating connection between a controller and the actuator 326. The item actuator line 325 may be a wired or wireless communication connection between a controller and the actuator 326. The item actuator 326 may have a physical communication connection with the item actuator line 325. In some embodiments, the item actuator 326 may be communicatingly coupled with a receiver (not shown) which receives information wirelessly along the wireless item actuator line 325. The item actuator 326 may receive information related to certain characteristics of operation of the item actuator 326 communicated from the controller along the item actuator line 325. Such information may be used to control the speed of the item actuator 326 and thereby control the speed of the items 330 on an item conveyor, such as the item conveyor 120 or 220.

The system 300 may include a tray actuator line 368 and the tray actuator 369. The tray actuator line 368 and the tray actuator 369 may have the same or similar features as, respectively, the item actuator line 325 and the item actuator 326. The tray actuator 369 may receive information related to certain characteristics of operation of the tray actuator 369 communicated from a controller along the tray actuator line 368. Such information may be used to control the movement of the tray actuator 369 and thereby control the movement of the trays 385 on a tray conveyor, such as the tray conveyor 165 or 265.

The various actuators may be used to control the speed of movement and/or position of the conveyors and thus of the various objects thereon. In some embodiments, the tray actuator 369 may be used to control the position of the tray conveyor and the trays thereon. For example, the tray actuator 369 may be used to control the position of the tray 385. In some embodiments, the tray actuator 369 may be used to control the position of the first tray 285A and/or the second tray 285B on the tray conveyor 265. Similarly, the item actuator 326 may be used to control the speed or position of one or more items 330 on an item conveyor, such as the item conveyor 120 or 220.

The system 300 may include one or more of the guide paddle actuators 383. The guide paddle actuator 383 may control movement of a guide paddle, such as the guide paddle 180. The guide paddle actuator 383 may be connected to the controller 395. The controller 395 may control the guide paddle actuator 383 to controllably extend the guide paddle into a tray and retract the paddle therefrom.

The system 300 may include one or more of the tray movement sensors 396, 398 and/or one or more of the conveyor movement sensors 397. The tray movement sensors 396, 398 may detect the presence or absence of the trays as the trays move along the tray conveyor subsystem. The tray movement sensors 396, 398 may have the same or similar features as other tray sensors described herein, for example the tray movement sensors 894, 895 described with respect to FIGS. 8A-8D. The conveyor movement sensor 397 may detect movement of the tray conveyor. The conveyor movement sensor 397 may have the same or similar features as other conveyor movement sensors described herein, for example the conveyor movement sensor 896 described with respect to FIGS. 8A-8D. The tray movement sensors 396, 398 and/or the conveyor movement sensor 397 may be in communicating connection with the controller 395. The tray movement sensors 396, 398 may provide data to the controller 395 related to the presence and/or absence of the trays. The conveyor movement sensor 397 may provide data to the controller 395 related to the movement of the tray conveyor.

The system 300 may include the controller 395. The controller 395 may control various characteristics of the various actuators based on height data collected by the various sensors. In some embodiments, the controller 395 may receive height data from the item sensor 346 and/or the stack sensor 392 in order to control movement, for example position and/or speed, of the tray actuator 369 and/or the item actuator 326. In some embodiments, the controller 395 may receive tray conveyor movement data from the conveyor movement sensor 397. In some embodiments, the controller 395 may receive tray presence or absence data from the tray sensors 396, 398. Some or all of the data received by the controller 395 from the various input sources may be used to control various aspects of the system 300. In some embodiments, the controller 395 may control the position and/or movement of the various actuators. For instance, the controller 395 may control the position of a tray conveyor with the tray actuator 369. As is discussed in further detail herein, for example with respect to FIG. 8, the controller 395 may control the position of one or more trays on the tray conveyor using the tray actuator 369. The position of the one or more trays may be determined based on height data received from the stack sensor 392 and/or the item sensor 346. In some embodiments, the controller 395 may control the guide paddle actuator 383. In some embodiments, the controller 395 may control the torque of the various actuators. Therefore, a variety of characteristics of the actuators may be controlled by the controller 395, and these are merely some examples.

In some embodiments, the controller 395 may use the data received from the item sensor 346 to control the item actuator 326, and the controller 395 may use data received from the stack sensor 392 to control the tray actuator 369. In some embodiments, the height data from both the item sensor 246 and the stack sensor 392 may be used to control both the tray actuator 369 and the item actuator 326. Therefore, various sources of the data related to the height of the items may be used to control various particular actuators. These are merely some examples and other configurations and combinations are possible. In some embodiments there may only be a single sensor. For example, the system 300 may only include the stack sensor 392 and not include the item sensor 346. Therefore, data from the stack sensor 392 may be used by the controller 395 to control both the tray actuator 369 and the item actuator 326. In some embodiments, the system 300 may only include the item sensor 346 and not include the stack sensor 392. The height data from the item sensor 346 may then be used by the controller 395 to control both the tray actuator 369 and the item actuator 326.

The controller 395 may be a variety of types of controllers with inputs and outputs for reading and sending data to control the processing of the items 330 with the system 300. The controller 395 may be an electronic controller that receives and analyzes data related to the height of the item 330 on the item conveyor and the height of the stack 390 in the tray 385 and then transmits data related to control of the tray actuator 369 and the item actuator 326.

In some embodiments, the controller 395 may be a programmable logic controller (PLC). For instance, the controller 395 may be a unitary PLC and contain all of the basic system components within a single housing or box, such as the processor, which may run a software program, in addition to ports for input and output connections. In some embodiments, the controller 395 may be a MELSEC-Q PLC, manufactured by Mitsubishi (Japan). In some embodiments, the controller 395 may be other suitable controllers. The controller 395 may include an on-board memory for storing programs, 32 digital input and output ports, and a communications port used to program the unit. As another example, the controller 395 may be a modular PLC with several different modules that can be coupled together to build a customized controller. A base module may contain core functions such as electrical power regulation, the computer processor, and input connections. Additional modules, including analog to digital signal converters or additional outputs, may be added to this core unit. Such a modular controller may be easily customized or changed to accommodate different requirements of the system 300, such as the volume of items 330 or the speed of processing. In some embodiments, the modular controller may be a Mitsubishi MELSEC-Q PLC, which handles 384 discrete I/O, analog I/O and network communication cards. In some embodiments, the controller 395 may be other suitable modular controllers. The number of connections may also be expanded by adding modules. As a further example, the controller 395 may be a rack mounting PLC which may keep each module separate. The extra modules may be connected through a network, and the modules may be held in organized racks. This approach may allow for a larger system 300 to be conveniently built. In some embodiments, the controller 395 may be a MELSEC-Q or other suitable rack mounting PLC, which may allow for a large, scalable system 300.

These are just some examples, and the controller 395 may be other suitable types of controllers. In some embodiments, the controller 395 may be a supervisory control and data acquisition (SCADA) controller. In some embodiments, the controller 395 may be a distributed control system (DCS) controller. In some embodiments, the controller 395 may be several small embedded controllers, such as the Lantronix Xport and Digi/ME, that is attached to an industrial computer via a network.

The controller 395 may use a variety of control mechanisms. In some embodiments, the controller 395 may be a feedback controller, such as a positive or negative feedback controller. The feedback controller 395 may receive one or more inputs related to height data and based thereon compute desirable outputs of speeds and/or positions for the tray actuator 369 and/or the item actuator 326. For example, the feedback controller 395 may be a control loop feedback controller, such as a proportional-integral-derivative controller (PID controller). When using a PID feedback controller as the controller 395, the controller 395 may calculate an error value as the difference between a measured process variable and a desired set point, such as the difference between the current height of the stack 390 and a desired height of the stack 390. Such a controller 395 may minimize the error, i.e. continue to inject items 330 onto the stack 390, by adjusting the speed and/or position of the actuators. In some embodiments, the controller 395 may be a feedforward controller which may measure disturbances and account for them before they have time to affect the system 300. For example, a feed-forward controller 395 may measure the height of the items on the item conveyor and predict the future height of the stack based on the combined height of the items on the item conveyor. In some embodiments, the benefits of feedback control (controlling unknown disturbances and not having to know exactly how a system will respond to disturbances) and the benefits of feed-forward control (responding to disturbances before they can affect the system) may be combined in a single controller 395. These are merely some examples of the mechanism that may be employed by the controller 395 and other suitable mechanisms are within the scope of this disclosure.

The system 300 may include an item conveyance subsystem 310 and a tray conveyance subsystem 350. As shown, the item conveyance subsystem 310 may include the item sensor 246, the items 330 being detected by the item sensor 346 and the item actuator 326. In some embodiments, the tray conveyance subsystem 350 may include the guide paddle actuator 383, the stack sensor 392, the stack 390 of items 330 in the tray 385, the tray actuator 369, the tray sensors 396, 398 and the conveyor movement sensor 397. These are merely some examples, and these or other components of the system 300 may be parts of the various subsystems. In some embodiments, portions of the various communication lines 348, 394, 368, 325 may be part of the item conveyance subsystem 310 and/or the tray conveyance subsystem 350. Further, the controller 395 may also be part of the item conveyance subsystem 310 and/or the tray conveyance subsystem three 350. In some embodiments, the guide paddle actuator 383 may be part of the item conveyance subsystem 310. Further, the various subsystems 310, 350 may include fewer items than those shown and described in FIG. 3. In some embodiments, the item conveyance subsystem may only include the item sensor 246 and/or the item actuator 326. In some embodiments, the tray conveyance subsystem 350 may only include the stack sensor 292 and/or the tray actuator 369. Therefore, the configuration of the system 300 and the various subsystems 310, 350 therein are merely some examples and other suitable configurations may be used.

Figure 4:
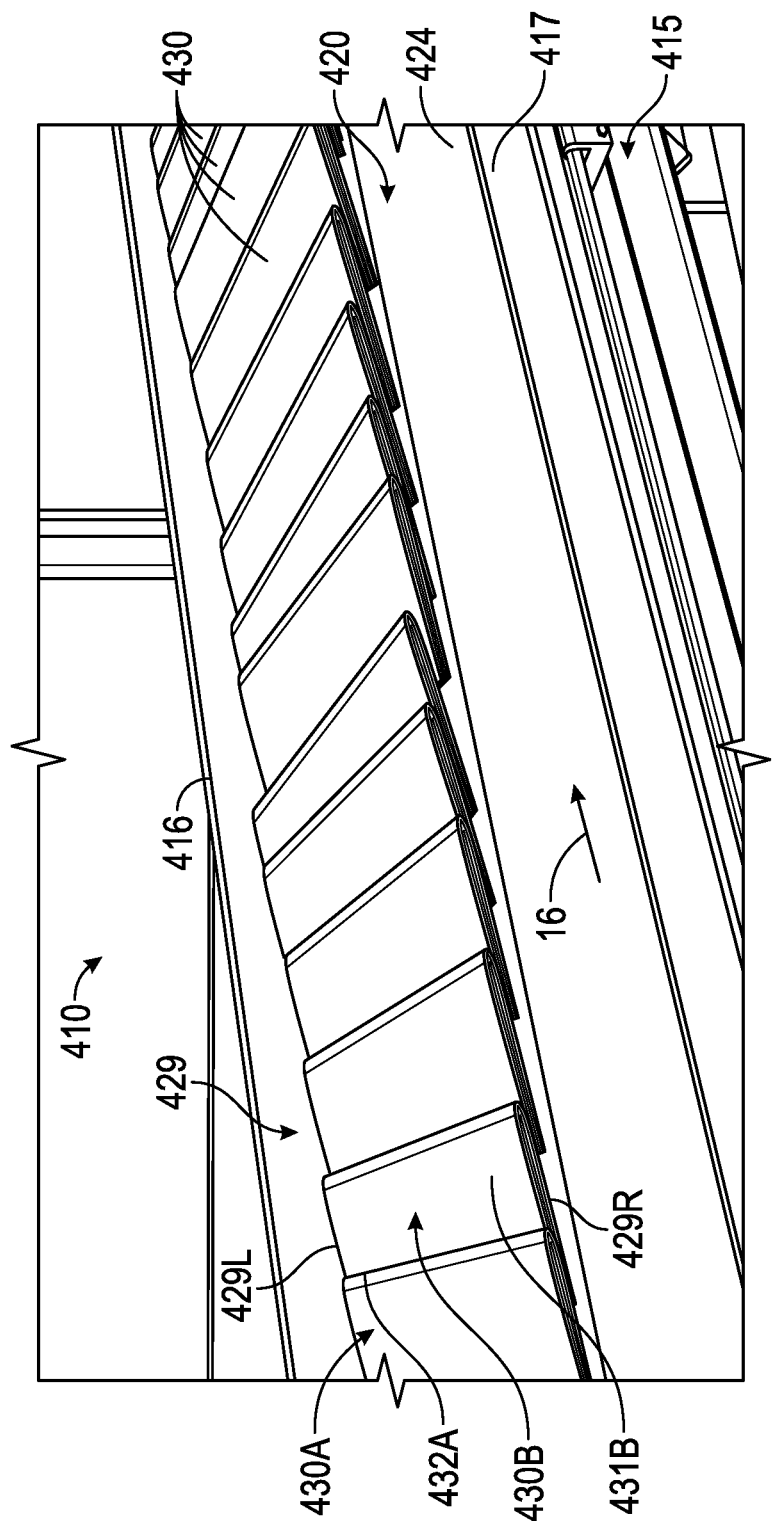
FIG. 4 is a perspective view of an embodiment of an item conveyance subsystem that may be used with the systems of FIGS. 1A, 1B, 2 and 3.

FIG. 4 is a perspective view of an item conveyance subsystem 410. The item conveyance subsystem 410 may have the same or similar features as other item conveyance subsystems described herein, for example the item conveyance subsystem 110 or 210.

The item conveyance subsystem 410 may be used to convey one or more items 430 in a feed direction 16. The item conveyance subsystem may include a support 415. The support 415 may be a supporting mechanical structure for the item conveyance subsystem 410. In some embodiments, the support 415 may be a metallic frame rigidly connecting the item conveyance subsystem 410 to a foundation, such as the ground 10. The support 415 may further include a left wall 416 and/or a right wall 417. The left and right walls 416, 417 may extend along or near the edges or sides of the item conveyance subsystem 410, for example along the sides of an item conveyor therein.

The item conveyance subsystem 410 may include an item conveyor 420. The item conveyor 420 may have one or more items thereon and move those items in the feed direction 16. The item conveyor 420 may have the same or similar features as the other item conveyors described herein, for example the item conveyor 120 or 220. The item conveyor 420 may include a belt 424. The belt 424 may have the same or similar features as other belts described herein, for example the belt 224. The belt 424 may have the items resting thereon and may be moving in the feed direction 16. The belt 424 may be elongated and positioned in between the left wall 416 and right wall 417 of the support 415.

The items 430 may be positioned on the item conveyor 420, for instance on the belt 424, in a shingled arrangement 429. The shingled arrangement 429 may be a collection of two or more of the items 430 arranged or otherwise oriented in a partially overlapping configuration. The shingled arrangement 429 may be a single line of the items 430 extending along the length of the item conveyor 420, for example along the length of the belt 424. The shingled arrangement 429 of the items 430 may be on various sections of the item conveyor 420. In some embodiments, the shingled arrangement 429 may be on a low-speed section, a high-speed section and/or an injector of the item conveyor 429. These sections may have the same or similar features as, respectively, the low-speed section 222, the high-speed section 236, and the injector 240. The shingled arrangement 429 may have a left side 429L and a right side 429R formed or defined by the items 430 as arranged in the shingled arrangement 429. As shown, the items 430 may be lined up such that opposing edges of the items 430 form the left side 429L and the right side 429R of the arrangement 429.

The shingled arrangement 429 may include a first item 430A and a second item 430B that is adjacent the first item 430A. The second item 430B may be in front of the first item 430A in the feed direction 16. As shown, the first item 430A may be partially resting on top of the second item 430B. The second item 430B may include a top surface 431B that faces the first item 430A. Therefore, a portion of the first item 430A may be resting on the top surface 431B of the second item 430B. As further shown, the first item 430A may include a leading edge 432A along a forward portion of the first item 430A ("forward" with respect to the feed direction 16). The leading edge 432A of the first item 430A may be resting on the top surface 431B of the second item 430B. The leading edge 432A may be a forward edge ("forward" with respect to the feed direction 16) of the first item 430A that is resting on the top surface 431B of the second item 430B. The first item 430A and the second item 430B may be positioned at a variety of distances relative to each other, such as those described herein with respect to distances W1 and W2 in FIG. 2.

Figure 5:
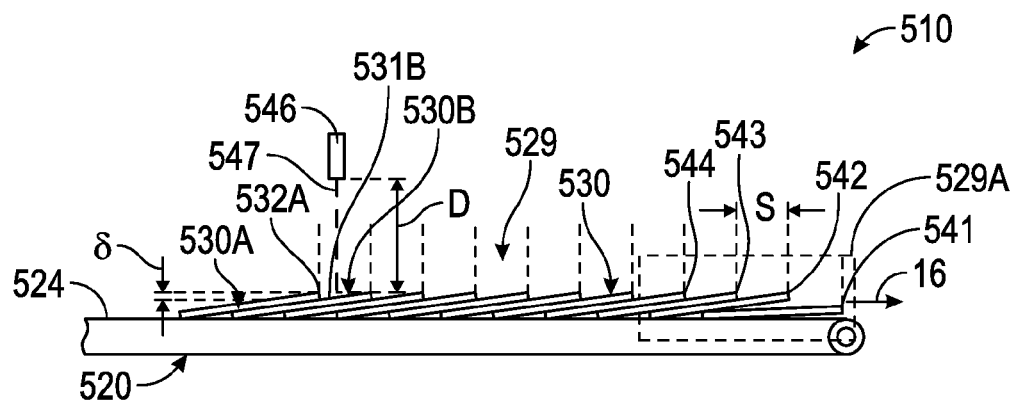
FIG. 5 is a side view of an embodiment of an item conveyance subsystem that may be used with the systems of FIGS. 1A, 1B, 2 and 3.

FIG. 5 is a side view of a schematic of an embodiment of an item conveyance subsystem 510. The item conveyance subsystem 510 may have the same or similar features as other item conveyance subsystems described herein, such as the item conveyance subsystems 110, 210, 310, or 410.

As shown, the item conveyance subsystem 510 may include an item conveyor 520 having a belt 524. The item conveyor 520, in particular the belt 524, may be supporting and moving multiple items 530 thereon. The items 530 may be in a shingled arrangement 529. The shingled arrangement 529 may have the same or similar features and functions as other shingled arrangements of the items described herein, for example the shingled arrangement 229 or 429. The items 530 may be moved by the item conveyor 520 in the feed direction 16 as shown.

An item sensor 546 may be positioned a distance D above the items 530 on the belt 524. In some embodiments, the distance D may be about three and a half inches (3.5"). In some embodiments, the distance D may be greater or less than three and a half inches (3.5"). The distance D between the item sensor 546 and the items 530 may be used to calculate or otherwise determine the relative heights of the items 530 moving on the item conveyor 520. The item sensor 546 may transmit a transmission 547 along a direction toward the items 530 in the shingled arrangement 529. The transmission 547 may have the same or similar features as other transmissions described herein, for example the transmission 347 or 393.

As shown, the shingled arrangement 529 of the items 530 may include a first item 530A and an adjacent second item 530B. The first item 530A may be resting partially on the second item 530B. The first item 530A and the second item 530B may have the same or similar features as, respectively, the first item 430A and the second item 430B, and vice versa. The first item 530A may have a leading edge 532A resting on a top surface 531B of the second item 530B. Therefore, as the items 530 move on the item conveyor 520 in the feed direction 16, the item sensor 546 may detect the distance at various portions of the top surface 531B of the second item 530B and the distance to the leading edge 532A of the first item 530A. Thus, the distance D may change as the items 530 move past the item sensor 546. For example, the distance D may increase as the top surface 531B is detected by and moves past the item sensor 546 in the feed direction 16. The distance D may then decrease as the leading edge 532A of the first item 530A is detected by and moves past the item sensor 546 in the feed direction 16. The various measured distances D may be used to approximate the thicknesses of the various items 530 and/or of the shingled arrangement 529.

The thickness of the first item 530A and/or of the arrangement 529 may be approximated by a distance $\delta$. The changing distance D between the top surface 531B and the leading edge 532A may be used to determine $\delta$. In some embodiments, $\delta$ may be equal to the difference between a) the distance to a portion of the top surface 531B of the second item 530B that is adjacent or otherwise near the leading edge 532A and b) the distance to the leading edge 532A of the first item 530A. In some embodiments, $\delta$ may be equal to the maximum distance detected to the top surface 531B and the minimum distance detected to the leading edge 532A. In some embodiments, $\delta$ may be equal to about $\frac{1}{16}"$, $\frac{1}{8}"$, $\frac{1}{4}"$, $\frac{3}{8}"$, $\frac{1}{2}"$ or other lower, intermediate or greater thicknesses.

The items 530A, 530B in the shingled arrangement 529 may be angled with respect to the direction of the transmission 547 that may be transmitted from the item sensor 546. Thus, the detected/determined distance $\delta$ may not be exactly equal to the thickness of the first item 530A. In some embodiments, $\delta$ is proportional to the actual thickness of the item 530A. In some embodiments, calculations may be performed, for example with the controller 395, that account for the relative angled orientations between the items 530A, 530B and the transmission 547 from the item sensor 546. In some embodiments, the item sensor 546 may be oriented such that it is slightly angled with respect to a vertical direction (for example, with respect to the vertical direction 12 as shown in FIG. 1B). The item sensor 546 may thus be oriented relative to the items 530 in the shingled arrangement 529 such that the transmission 547 from the item sensor 546 is approximately orthogonal to the top surfaces of the items 530, such as to the top surface 531B of the second item 530B. Such arrangements may provide a more accurate assessment of the thickness $\delta$ of the first item 530A.

The items 530 in the shingled arrangement 529 may have consecutive leading edges of consecutive items 530. As shown, a portion 529A of the shingled arrangement 529 may include four consecutive leading edges 1, 2, 3, and 4. The distance between two consecutive leading edges may be approximately equal to a distance S, as indicated in between leading edge 542 and leading edge 543. S may also refer to the distance between other adjacent leading edges, such as between leading edges 1 and 2, or leading edges 3 and 4. The distance S may have different values at different sections of the item conveyor 520. In some embodiments, S may have the value of distance W2 on the high-speed section 236 and/or the value W1 on the low-speed section 222 of the item conveyor 220.

The distances S, D and/or $\delta$, and data associated therewith, may be used to control the various systems described herein, for example the system 100, 200 or 300. In some embodiments, the distances S, D and/or $\delta$ and associated data may be used by the item conveyance subsystem 110, 210, 310 or 510, for example to control movement of the item conveyor 120, 220, 420 or 520. In some embodiments, the distances S, D and/or $\delta$ and associated data may be used by the tray conveyance subsystems described herein, for example the tray conveyance subsystems 110, 210 or 310, for example to control movement of the tray conveyors described herein, for example the tray conveyor 165 or 265. These are merely some examples of what the distances S, D and/or $\delta$, and data associated therewith, may be used to control, and other suitable scenarios may be implemented.

Figure 6:
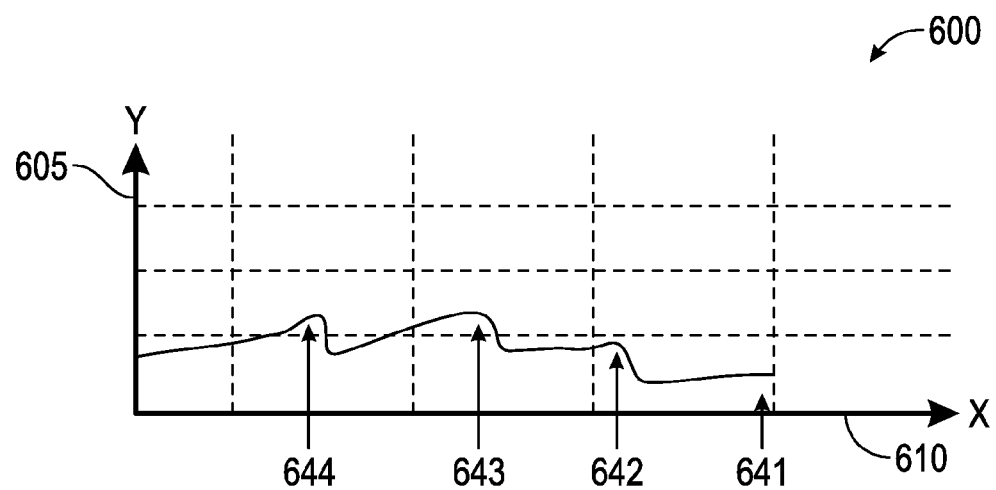
FIG. 6 is an embodiment of a plot of data that may be generated using the item conveyance subsystem of FIG. 5.

FIG. 6 is an example of a plot 600 of data generated from an item conveyance subsystem, as described herein. The plot 600 may include a vertical axis 605 and a horizontal axis 610. The vertical axis 605 may be indicative of the height or distance to the items on an item conveyor, such as the distance D from the item sensor 546 to the items 530 on the item conveyor 520. In some embodiments, the height maybe calculated as the difference in distance from the item sensor 546 to the conveyor and the distance from the item sensor 546 to the items 530. The vertical axis 605 may also be indicative of the relative height of such items. For example, the distance D may be detected and then a height may be calculated based on D and shown in the plot 600. The horizontal axis 610 may be indicative of the time or location to which such distances or heights on the vertical axis 605 correspond. For instance, in some embodiments, the vertical axis 605 may indicate the vertical distance or height of various items at different times or locations indicated by the horizontal axis 610.

As shown, the plot 600 may include data peaks 641, 642, 643 and 644 corresponding respectively to measurements of the leading edges 541, 542, 543 and 544 of the items 530 shown in FIG. 5. In some embodiments, the leading edge 541 may correspond to the first (right-most as oriented) item 530 in the shingled arrangement 529, the leading edge 542 may correspond to the second item 530, the leading edge 543 may correspond to the third item 530, and the leading edge 544 may correspond to the fourth item 530. As shown, the distance or height of the items may progressively increase from the leading edges of the first item 530 to the fourth item 530. Thereafter, the distances or heights of the various leading edges may stabilize such that the heights of subsequent leading edges are approximately the same. In some embodiments, the distances or heights of the various leading edges may vary such that the heights of subsequent leading edges are not approximately the same. In some embodiments, the height of the leading edge 543 may be greater than the height of the leading edge 542, which may in turn be greater than the height of the leading edge 541. The leading edge 544 and leading edges thereafter may be approximately the same as the height of leading edge 543, or they may be different.

The data shown in the plot 600 may be used to control the various systems described herein for processing items. For instance, the data in the plot 600 may be used to control the system 100, 200 or 300. Distance data in the plot 600 may be analyzed to extract or otherwise calculate the height of the items as they move along an item conveyor. For example, the item sensor 546 may sample the distance to the items 530 such that the height to the top surface 531B of the second item 530B is compared with the height of the leading edge 532A of the first item 530A. As another example, the height of the top surface of the item 530 having the leading edge 541 may be compared to the height of the leading edge 542 of the adjacent item 530. Similarly, the height to the top surface of the item 530 having the leading edge 542 may be compared to the height of the adjacent item 530 having the leading edge 543, etc. Such data may be sampled at various suitable frequencies, which may depend on the speed of movement of the items 530 past the item sensor 546.

Local peaks in the data plot 600, such as the local peaks 641, 642, 643 and 644, may be used to determine the quantity of items on the item conveyor. For instance, the number of such local peaks in the data plot 600 may be indicative of the quantity of items on the item conveyor. In some embodiments, the number of local peaks in the data plot 600 may be equal to the quantity of items on the item conveyor. For example, the local peaks 641, 642, 643 and 644 may be used to determine that there are four items. The remaining peaks may be analyzed to determine the remaining quantity of items. The quantity of items on the item conveyor may be used to control the movement on the items on the item conveyor as well as movement of the trays on the tray conveyor. In some embodiments, the thicknesses of the items may be known and the peaks may merely be counted. For instance, if the items all have the same thickness, then the peaks may be counted and the system may be controlled based on the quantity of the peaks without having to calculate the thickness of the items. This may be used for example where large quantities of the same item are processed.

Similar data plots may be generated using the stack sensor of the various systems described herein, such as the stack sensor 292 or 392 with the system 200 or 300, respectively. The stack sensor may generate data related to the height of the stack of items in a tray, such as the height of the stack 290 in the first tray 285A or the height of the stack 390 in the tray 385. Such data may show a generally sloping plot indicative of the progressively increasing height of the stack of items in the tray. In some embodiments, such data may have stepped increases in height. In some embodiments, such data may include local increases or decreases in height of the items due to injected items settling onto the stack. For instance, an item may be injected into the tray above the stack such that the stack sensor registers a height that is larger than the resulting height of the stack with the additional item. Using the system 200 shown in FIG. 2 as an example, the item conveyance subsystem 210 may inject the items 230 into the first tray 285A of the tray conveyance subsystem 250. As the item 230 is propelled by the injector 240 into the first tray 285A, the stack sensor 292 may register a height that is greater than the total of the height of the stack 290 with the item 230. This may be because the item 230 is moving through the air and has not yet settled onto the stack 290. As the item 230 settles onto the top of the stack 290, the stack sensor 292 may then detect the height of the stack 290 with the item 230. Overall, the detected height of the stack 290 may increase globally, that is over longer time frames, but may increase or decrease locally, that is over shorter time frames.

Other data associated with height or distance data may be generated using the plot 600. In some embodiments, the time in between distance measurements may be used. For example, the time in between measurement of leading edge 543 and measurement of leading edge 544 may be used. Such time data may be used to control the relative speed and/or position of the various conveyors, such as the item conveyors 120, 220, 420, 520 or tray conveyors 165, 265. In some embodiments, the various conveyors may be sped up or down based on such data. In some embodiments, the various conveyors may be moved to different positions based on such data.

In some embodiments, the various conveyors may be started, moved, and/or stopped in response to such data. For example, the tray conveyors described herein, such as the tray conveyors 165 or 265, may be moved as they receive items therein. Data on the height of the stack of items in a tray and data on the height of items on a tray conveyor may be used to move the trays on the tray conveyor as the items are injected therein. For instance, for relatively thicker items and/or for relatively large quantities of items on an item conveyor, the tray conveyor may be sped up or move in quicker intervals or farther distances because the tray may fill up relatively faster. Conversely, for relatively thinner items and/or for relatively smaller quantities of items on an item conveyor, the tray conveyor may slow down or move in longer intervals or shorter distances because the tray may fill up relatively slower. Further detail of the movement of the trays on the tray conveyor are described herein, for example with respect to FIGS. 8A-8D FIG. 7 is a perspective view of an embodiment of a tray 785. The tray 785 may be used in the various systems described herein, such as the system 100, 200, or 300. The tray 785 may be included in the various tray conveyance subsystems described herein, such as the tray conveyance subsystem 150, 250, or 350. The tray 785 may have the same or similar features as the other trays described herein, for example the tray 185, 285A, 285B, or 385, and vice versa.

Figure 7:
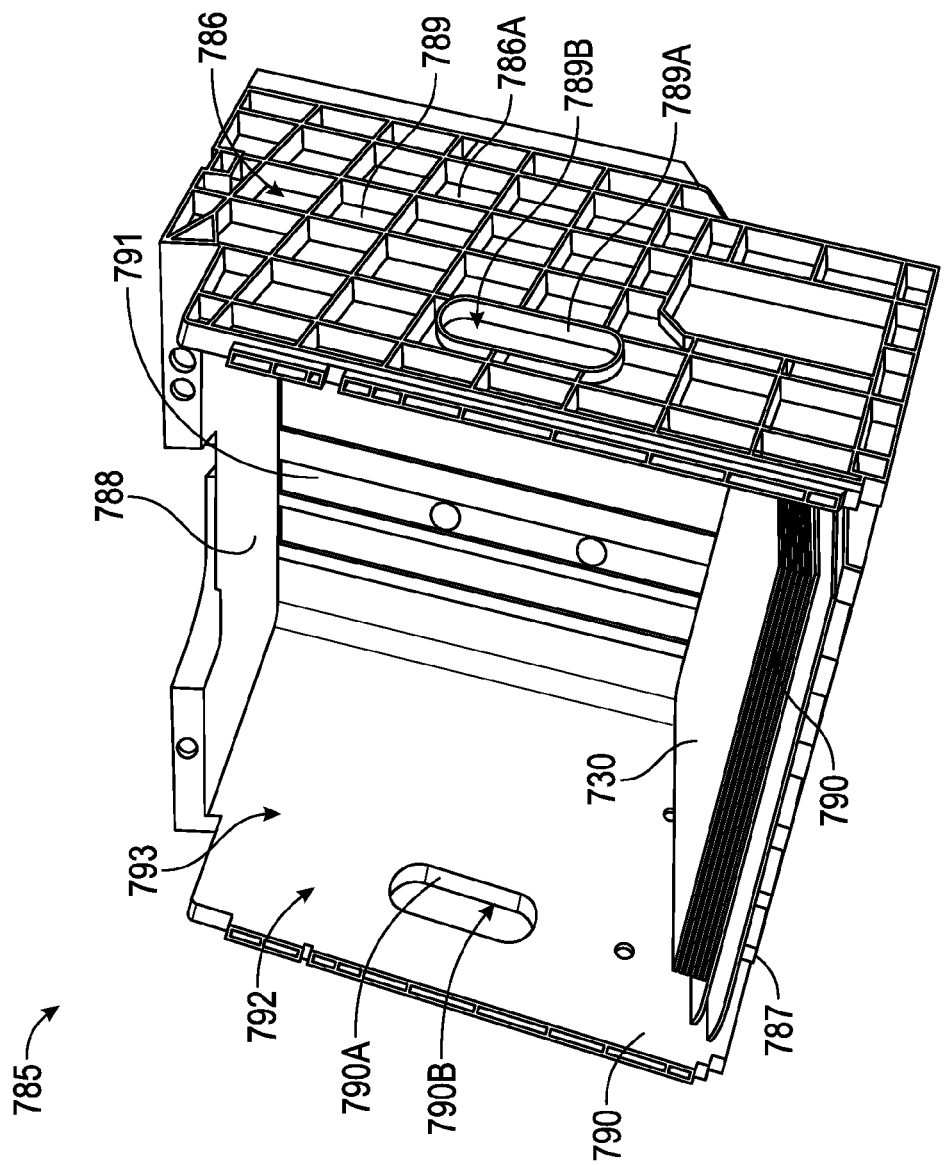
FIG. 7 is a perspective view of an embodiment of a tray that may be used with the systems of FIGS. 1A, 1B, 2 and 3.

As shown in FIG. 7, the tray 785 may include a sidewall 786. The sidewall 786 may form a partial enclosure and extend along an outer perimeter of the tray 785. The sidewall 786 may be formed of a variety of rigid materials, such as plastics, polymers, metals or metal alloys, other suitable materials or combinations thereof. The sidewall 786 may include various portions. As shown, the sidewall 786 may include a front sidewall 787 located on a front side of the tray 785 and a rear sidewall 788 located opposite the front sidewall 787 on a rear side of the tray 785. The distance between the front sidewall 787 and the rear sidewall 788 may be about thirteen inches (13"). The sidewall 786 may include a left sidewall 789 located in between and approximately perpendicular to the front and rear sidewalls 787, 788 and a right sidewall 790 located opposite the left side wall 789. The various portions of the sidewall 786 may be connected or otherwise coupled together. As shown, opposite ends of the front sidewall 787 may be connected with the left side wall 789 and the right side wall 790. Similarly, opposite ends of the rear sidewall 788 may be connected with the left side wall 789 and the right side wall 790.

The sidewall 786 may include an outside surface 786A and/or an inside surface 792. The outside surface 786A and inside surface 792 may refer to outside or inside surfaces, respectively, of the various portions of the sidewall 786. In some embodiments, portions of the outside surface 786A of the sidewall, such as the portion of the outside surface 786A of the bottom side 791, may rest on a tray conveyor belt, such as the belt 267 of the tray conveyor 265. In some embodiments, the various stack sensors described herein, for example the stack sensor 292, may detect the distance to the inside surface 792 of the front sidewall 787. In some embodiments, the stack sensor may detect the distance to the inside surface 792 of the front sidewall 787 before any items have been injected into the tray 785.

The sidewall 786 may include various features for handling the tray 785. As shown, the left side wall 789 may include an inner edge 789A forming a left handle 789B. Similarly, the right side wall 790 may include an inner edge 798A forming a right handle 790B. The various handles may be openings through the various respective portions of the sidewall 786 through which a hand or device made be inserted to handle the tray 785.

The tray 785 may include a bottom side 791. The bottom side 791 may be coupled with or otherwise attached to a bottom portion of the sidewall 786. In some embodiments, the distance from a top portion of the sidewall 786 to the bottom side 791 may be about eleven inches (11"). The bottom side 791 may also include a portion of the outside surface 786A and/or the inside surface 792. In some embodiments, the outside surface 786A of the bottom side 791 may rest on a tray conveyor belt, such as the belt 267 of the tray conveyor 265.

The sidewall 786 and bottom side 791 may form or otherwise define an interior 793 therein. The interior 793 may be a volume defined or otherwise formed by the inside surface 792 of the tray 785. The interior 793 may be configured to receive one or more items 730 therein, as shown. The items 730 may form a stack 790 on the inside surface 792 of the front sidewall 787. The items 730 and stack 790 may have the same or similar features as other items and stacks described herein, such as the items 130 or stack 290, respectively. The stack 790 may form on and extend away from the front sidewall 787 in the interior 793 of the tray 785. The edges of the items 730 may contact various portions of the sidewall 786, such as the inside surface 792 of the left side wall 789, the right side wall 790, and/or the bottom side 791. The stack 790 of items 730 may therefore be resting on the front sidewall 787 and be detected in this location by any of the stack sensors described herein, such as the stack sensor 292 or 392.

FIGS. 8A-8D are side views of an embodiment of a tray conveyance subsystem 850 at four sequential points in time. The subsystem 850 may have the configuration shown in FIG. 8A at a first point in time. The subsystem 850 may have the configuration shown in FIG. 8B at a second point in time that is later than the first point in time. The subsystem 850 may have the configuration shown in FIG. 8C at a third point in time that is later than the second point in time. The subsystem 850 may have the configuration shown in FIG. 8D at a fourth point in time that is later than the third point in time. Thus, the subsystem 850 may sequentially have the configurations shown in the order of FIG. 8A to 8B to 8C to 8D.

Referring to FIGS. 8A-8D, the subsystem 850 may include a tray conveyor 865 with a first tray 885A and/or a second tray 885B located thereon. The tray conveyor 865 may have the same or similar features as other tray conveyors described herein, for example the tray conveyor 165 or 265, and vice versa. The first and second trays 885A, 885B may have the same or similar features as other trays described herein, for example the tray 185, 285A, 285B, 385 or 785. The first tray 885A may have a front sidewall 887A, a rear sidewall 888A, a bottom side 891A, and an interior 893A. These portions of the tray 885A may have the same or similar features as other front sidewalls, rear sidewalls, bottom sides or interiors described herein, for example the front sidewall 287 or 787, the rear sidewall 788, the bottom side 791, and the interior 793, respectively, and vice versa. The bottom side 891A may be resting on the tray conveyor 865, for example on a belt of the tray conveyor 865.

The subsystem 850 may include a guide paddle 880. The guide paddle 880 may have the same or similar features as other guide paddles described herein, for example the guide paddle 180 or 280, and vice versa. The guide paddle 880 may be coupled with a guide paddle arm 881 that is coupled with a guide paddle support 882. The arm 881 may be rotatably attached to the guide paddle 880 and to the support 882 such that rotational movement of the arm 881 may move the guide paddle 880 approximately in a linear direction as indicated. In some embodiments, the guide paddle 880 may be actuated linearly. For instance, the support 882 and the arm 881 may be aligned linearly such that the guide paddle 880 extends into and retracts out of the first tray 885A in a linear direction. In some embodiments, the arm 881 may be a pneumatic actuator that linearly slides a rod connected to the paddle 880. Thus, the embodiment shown is merely one example of how the guide paddle 880 may be moved, and other suitable configurations may be implemented. The guide paddle support 882 may be attached to a supporting structure, for example the item conveyor support 115 or the tray conveyor support 155. The guide paddle support 882 may include an actuator 883 that moves the guide paddle arm 881. By actuating the actuator 883, the guide paddle arm 881 may move such that the guide paddle 880 extends into and retracts out of the tray 885A. In some embodiments, the actuator 883 may be directly coupled with and thereby directly move the guide paddle 880.

The subsystem 850 may include a first tray sensor 894. The sensor 894 may be a photoelectric sensor such as a photo-eye, motion sensor, proximity sensor, or other type of sensor that detects the presence or absence of a tray in its line of sight. The first tray sensor 894 may be a capacitive sensor, a capacitive displacement sensor, a Doppler effect sensor, an Eddy-current sensor, an inductive sensor, a laser rangefinder, a magnetic sensor, a magnetic proximity fuse sensor, a passive optical sensor, a passive thermal infrared sensor, a photocell sensor, a reflective sensor, a radar sensor, a sonar sensor, an ultrasonic sensor, a fiber optics sensor, a hall effect sensor, or other suitable sensors. The first tray sensor 894 may be attached to a support of the tray conveyor 865, for example to the support 155. The first tray sensor 894 may be located at a distance along the length of the tray conveyor 865 that aligns with various portions of the tray 885A. The first tray sensor 894 may be located at a distance along the length of the tray conveyor 865 that aligns with the front sidewall 887A of the tray 885A when the tray 885A begins receiving items therein. At this distance along the length of the tray conveyor 865, the first tray sensor 894 may be positioned in various locations. As shown, the first tray sensor 894 may be located on the opposite side of the tray conveyor 865 relative to the trays 885A, 885B. In some embodiments, the first tray sensor 894 maybe located along the sides of the trays. In some embodiments, the first tray sensor 894 may be located at these various locations with respect to the various tray conveyors described herein, for example the tray conveyor 165 or 265. In some embodiments, the first tray sensor 894 may be located in between portions of a belt of the tray conveyor 865. For example, the first tray sensor 894 may be located in between portions of the belt 267 of the tray conveyor 265. These are merely some examples, and the first sensor 894 may be located in various other positions, for example along the side or top of the trays 885A, 885B, or other suitable locations.

The subsystem 850 may include a second tray sensor 895. The second tray sensor 895 may have the same or similar features as the first tray sensor 894, and vice versa. The second tray sensor 895 may be located at a distance along the length of the tray conveyor 865 that is less than that of the first tray sensor 894. Therefore, the first and second tray sensors 894, 895 may be positioned with the first tray sensor 894 located "in front" (as oriented in the figure) or "upstream" of the second tray sensor 895. "Upstream" here refers to a direction that is opposite to the direction of movement of the tray conveyor 865. In some embodiments, the distance between the first tray sensor 894 and the second tray sensor 895 along the length of the tray conveyor 865 may be about six inches (6"). The second tray sensor 895 may be located at a distance along the length of the tray conveyor 865 that aligns with various portions of the tray 885A. The sensor 895 may be located at a distance along the length of the tray conveyor 865 that aligns with the rear sidewall 888A of the tray 885A when the tray 885A moves along the tray conveyor 865 after receiving items therein. At this or other distances along the length of the tray conveyor 865, the sensor 895 may be positioned in various locations, such as those described with respect to the first tray sensor 894.

The subsystem 850 may include a conveyor movement sensor 896. The sensor 896 may be an encoder or other suitable sensor that detects, tracks, senses or otherwise determines the movement and/or position of the tray conveyor 865. In some embodiments, the sensor 896 may determine the movement and/or position of a belt of the tray conveyor 865, such as the belt 267 of the tray conveyor 265. The sensor 896 may have teeth or other protrusions that fit into complementary recesses of the belt or conveyor. Rotation of the sensor 896 may indicate movement and/or position of the belt or conveyor. Data collected from the sensor 896 may be used by the systems described herein, for example the system 300, to control movement of the belt or conveyor.

Figure 8A:
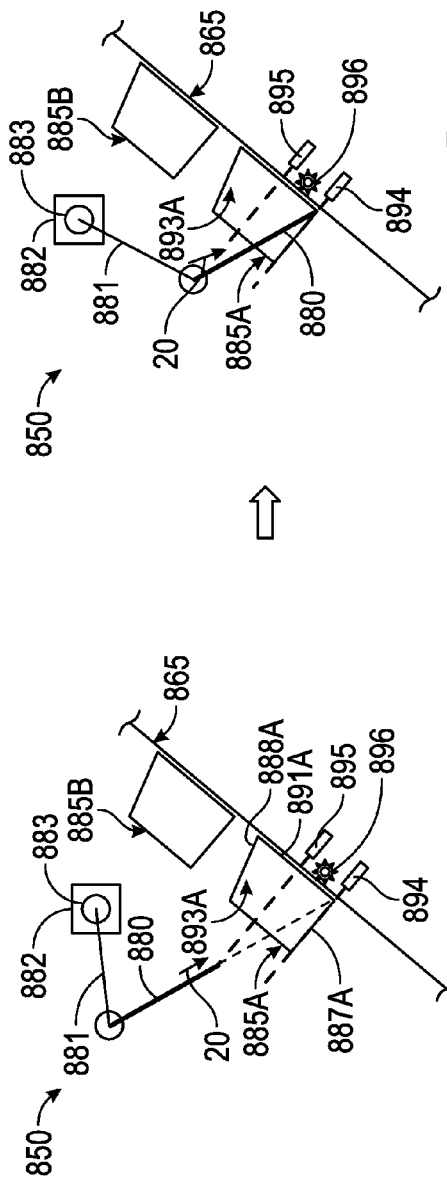
FIGS. 8A-8D are side views of an embodiment of a tray conveyance subsystem at four sequential points in time that may be used with the systems of FIGS. 1A, 1B, 2 and 3.
Figure 8B:
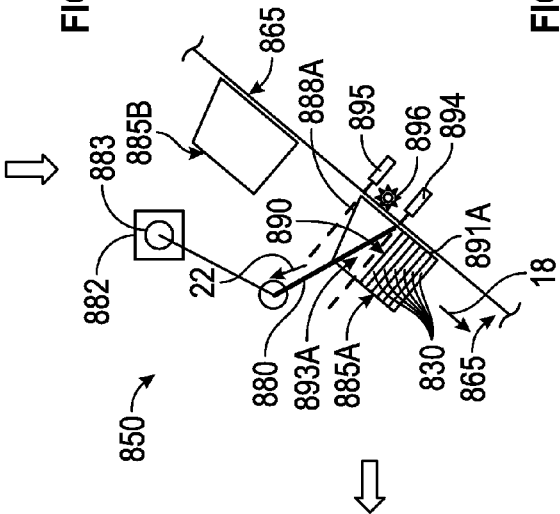

Referring to FIG. 8A, the subsystem 850 may include the guide paddle 880 in a retracted position such that it is not extending into the interior 893A of the tray 885A. Further, the first tray 885A may be in a position along the tray conveyor 865 such that the tray 885A may begin receiving items therein after the guide paddle 880 has been extended into the tray interior 893A, as shown in FIG. 8B. In FIG. 8A, the guide paddle 880 may begin moving in the direction 20 as indicated. In some embodiments, the first tray 885A may be in a position along the tray conveyor 865 such that the front sidewall 887A is aligned with the first tray sensor 894. The sensor 894 may detect the presence of the front sidewall 887A and the subsystem 850 may stop movement of the tray 885A in this position. In some embodiments, the sensor 894 may detect the presence of the bottom side 891A of the tray 885A. In some embodiments, the sensor 894 may be located along the side of the tray 885A such that the sensor 894 detects the presence of the sidewall. For instance, the sensor 894 may detect the left or right sidewalls 789,790 of the tray 785. The second tray sensor 895 may detect the presence of the bottom side 891A of the tray 885A. In some embodiments, the second tray sensor 895 may be located along the side of the tray 885A such that the sensor 895 detects the presence of the sidewall. For instance, the sensor 895 may detect the left or right sidewalls 789,790 of the tray 785. The tray movement sensor 895 may sense the movement and positioning of the tray conveyor 865 in this position.

Referring to FIG. 8B, the subsystem 850 may include the guide paddle 880 in an extended position such that it is extending into the interior 893A of the tray 885A. The guide paddle 880 may move from the retracted position in FIG. 8A to the extended position in FIG. 8B. The guide paddle 880 may move in the direction 20 as indicated to extend into the tray 885A. The guide paddle 880 may move in the direction 20 exactly or approximately along a linear path. In some embodiments, the guide paddle 880 may move along a curved path. In some embodiments, the arm 881 may rotate relative to the support 882 to move the guide paddle 880. The guide paddle 880 may rotate relative to the arm 881 while extending into the tray 885A. The guide paddle 800 may be moved linearly, for example by a rod connected to a pneumatic actuator. In the configuration shown in FIG. 8B, the subsystem 850 may be ready to begin receiving items therein.

Figure 8C:
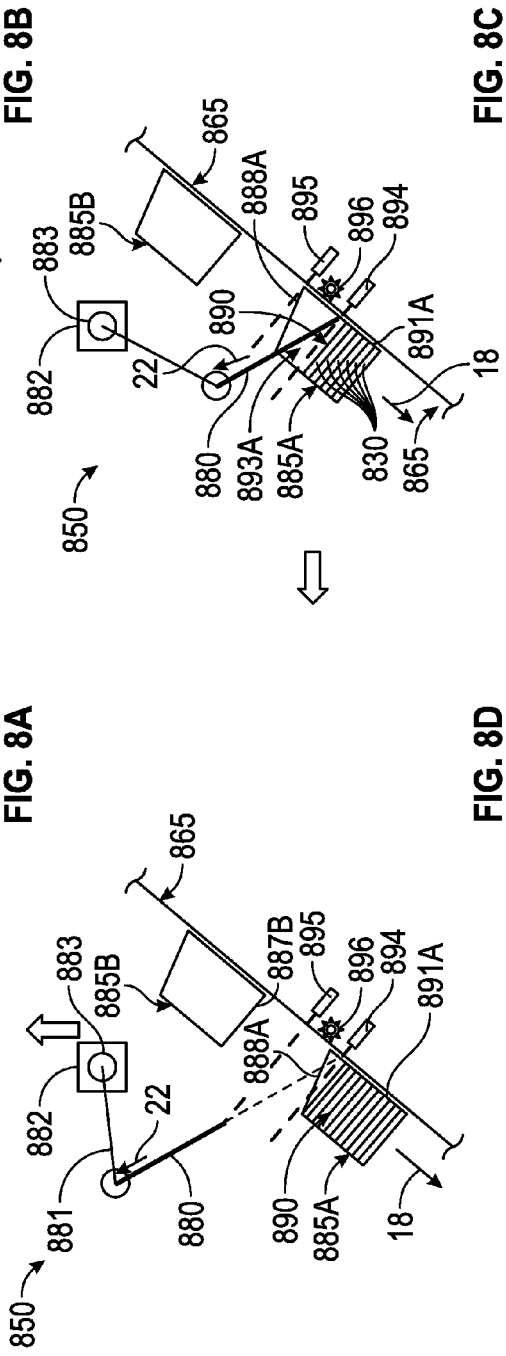

Referring to FIG. 8C, the first tray 885A may begin receiving one or more items 830 therein. The items 830 may form a stack 890 inside the first tray 885A. The items 830 and the stack 890 may have the same or similar features as other items and stacks described herein, respectively, for example the items 230, 330, 430, 530, 730 and the stacks 290, 390, and vice versa.

The first tray 885A may move along the tray conveyor 865 in the tray direction 18 as indicated while receiving the items 830 and as the stack 890 increases in height. As shown in FIG. 8C, the first tray 885A is partially full of items 830 and has moved relative to the first tray's 885A position shown in FIG. 8B. As the tray 885A receives the items 830, a stack sensor, such as the stack sensor 292 or 392, may detect the height of the items 830 in the stack 890, and based on such data a controller, such as the controller 395, may move the tray conveyor 865. In some embodiments, the tray 885A in FIG. 8C may be moving continuously in the tray direction 18 as the tray 885A receives the items 830. In some embodiments, the tray 885A in FIG. 8C may move in discrete amounts in the tray direction 18 as the tray 885A receives the items 830. In some embodiments, the tray conveyor 865 may move discrete amounts for a given detected increase in the height of the stack 890. For example, if an increase in height of the stack 890 of at least half an inch (0.5") is detected, the tray conveyor 865 may move half an inch (0.5") in the tray direction 18. Thus, the detected or calculated stack height may be the height of the stack 890 in a direction that aligns with the tray direction 18, such that the tray 885A is moved in the tray direction 18 the same or similar amount as the detected increase in height of the stack 890. In some embodiments, the tray 885A may be moved in the tray direction 18 a different amount as the detected increase in height of the stack 890. For example, the detected or calculated stack height may be the height of the stack 890 in a direction that does not align with the tray direction 18. These are merely some examples, and other suitable increases in height of the stack 890 and/or corresponding movements of the conveyor 865 may be implemented. Further, data collected with an item sensor, such as the item sensor 246 or 346, may be used to determine if and how far to move the tray conveyor 865. Such movements of the tray conveyor 865 may be detected by the tray movement sensor 896. This detected movement with the tray movement sensor 896 may also be used to determine if and how far to move the tray conveyor 865.

As the first tray 885A moves along the tray conveyor 865, the guide paddle 880 may be located at various locations inside the tray 885A. As shown in FIG. 8C, the guide paddle 890 may be closer to the rear sidewall 888A as compared to the configuration shown in FIGS. 8A and 8B. This may be due to the relative movement of the first tray 885A with respect to the guide paddle 880. Movement of the first tray 885A relative to the guide paddle 880 may assist with guiding the items 830 onto the top of the stack 890 as the tray 885A moves and as the stack 890 increases in height. In some embodiments, as the first tray 885A moves in the tray direction 18, the guide paddle 880 may be stationary with respect to a stationary component of the subsystem 850, such as the support 882. In some embodiments, as the first tray 885A moves in the tray direction 18, the guide paddle 880 may be moving with respect to a stationary component of the subsystem 850, such as the support 882.

In the position shown in FIG. 8C, the first and second tray sensors 894, 895 may detect the presence of the first tray 885A. In some embodiments, the first tray sensor 894 may be located along the side of the tray 885A such that the sensor 894 detects the presence of the sidewall. For instance, the sensor 894 may detect the left or right sidewalls 789,790 of the tray 785. In some embodiments, the first tray sensor 894 may detect the presence of a forward portion of the bottom side 891A of the first tray 885A. In some embodiments, the second tray sensor 895 may be located along the side of the tray 885A such that the sensor 895 detects the presence of the sidewall. For instance, the sensor 895 may detect the left or right sidewalls 789,790 of the tray 785. In some embodiments, the second tray sensor 895 may detect the presence of a rearward portion of the bottom side 891A. In some embodiments, the second tray sensor 895 may detect the presence of the rear sidewall 888A of the first tray 885A. As the first tray 885A moves in the tray direction 18 beyond the second tray sensor 895, the second tray sensor 895 may detect the absence of the first tray 885A.

Figure 8D:
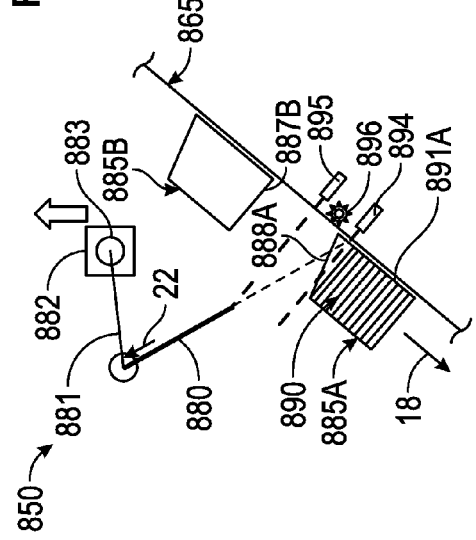

Referring to FIG. 8D, the first tray 885A may have a desired quantity and/or volume therein of the items 830 in the stack 890. Such a desired quantity and/or volume may be determined by detecting the height of the stack 890 in the first tray 885A, for example with the stack sensor 292 or 392. The desired quantity and/or volume may also be determined by detecting the height of the items on an item conveyor, for example by detecting with the item sensor 246 the height of the items 230 on the item conveyor 220. For instance, the height of the stack 890 inside the first tray 885A may not be greater than a desired height, but the system may detect the height of incoming items on the item conveyor that would cause the height of the stack 890 to be greater than an allowable height if those items were injected into the first tray 885A. Thus, the "desired" quantity or volume of the items 830 may be determined based on the height of items 830 in the first tray 885 and/or on the height of incoming items that are not yet in the first tray 885A.

When it is determined that the first tray 885A has a desired quantity and/or volume therein of the items 830 in the stack 890, the item conveyor may slow down or stop. In such a case, in some embodiments, the item conveyor, such as the item conveyor 220, may temporarily stop injecting items into the tray 885A, and/or the tray conveyor 865 may move the first tray 885A in the tray direction 18.

The guide paddle 880 may be retracted out of the first tray 885A after the desired height of the stack 890 is determined. In some embodiments, the guide paddle 880 may be retracted out of the first tray 885A after the first tray 885A has received the desired quantity and/or volume of the items 830 therein. In some embodiments, the guide paddle 880 may be retracted out of the first tray 885A after it is determined that the increased height of incoming items would cause the stack 890 to be greater than an allowed amount. The arm 881 may move linearly or rotate to remove the guide paddle 880 out of the first tray 885A. The guide paddle 880 may move approximately in the direction 22 as indicated when retracting out of the first tray 885A. The position of the guide paddle 880 as shown in FIG. 8D may be in the same or similar position as that shown in FIG. 8A.

The first tray 885A may move in the tray direction 18 after the guide paddle 880 is retracted out of the first tray 885A. In some embodiments, the first tray 885A may begin moving in the tray direction 18 before the guide paddle 880 is completely retracted out of the first tray 885A. In some embodiments, the first tray 885A may move in the tray direction 18 after the desired height of the stack 890 is determined. With the subsystem 850 in the configuration shown in FIG. 8D, the first tray sensor 894 may detect the presence of the bottom side 891 of the first tray 885A, and/or the second tray sensor may detect the absence of the rear sidewall 888A. Other portions of the tray sidewall may be detected such as with the sensors 894, 895 located along the sides of the first tray 885A, as described above. As the first tray 885A moves in the tray direction 18, the tray movement sensor 896 may detect movement of the tray conveyor 865. As the first tray 885A moves in the tray direction 18 beyond the first tray sensor 894, the first tray sensor 894 may detect the absence of the first tray 885A. The first tray 885A may move from the tray conveyor 865 to the lower tray conveyors described herein, such as the lower tray conveyor 170.

The second tray 885B may move with the first tray 885A in the tray direction 18. The second tray 885B may move into the same position as that of the first tray 885A shown in FIG. 8A. In that position, the second tray 885B may receive additional items 830 therein. The second tray 885B may now have the same features as the first tray 885A as described herein with respect to FIGS. 8A-8D. A third tray, a fourth tray, etc. (not shown) may be positioned behind the second tray 885B and may move along the tray conveyor 865 in the tray direction 18 with the first and second trays 885A, 885B and receive further items therein.

Data from the first and second tray sensors 894, 895 may be used by a controller to position the trays 885A, 885B and other trays along the length of the tray conveyor 865. The first tray sensor 894 may indicate that the first tray 885A is in position to have the guide paddle 880 extended therein and to begin receiving items. For instance, in FIG. 8A or 8B the first tray sensor 894 may detect the presence of the first tray 885A. At that point, a controller, such as the controller 395, may then stop the tray conveyor 865. As the first tray 885A moves, the second tray sensor 895 may detect the absence of the back portion of the first tray 885A. At that point, the controller 395 may actuate the guide paddle actuator 883 to retract the guide paddle 880 out of the first tray 885A and also slow down or stop the item conveyor. In some embodiments, to prevent fault detection, the first tray sensor 894 and second tray sensor 895 may work together to determine the tray presence and absence. For example, it may be determined that the tray is present when the second tray sensor 895 is blocked and the first tray sensor 894 switches from clear to blocked. As another example, it may be determined that the tray is absent when the first tray sensor 894 is blocked and the second tray sensor 895 switches from clear to blocked.

The controller 395 may also use data from the conveyor movement sensor 896 to locate the relative position of the tray conveyor 865. Such data may be used to verify the position of the tray conveyor 865. In some embodiments, data received from the conveyor movement sensor 896 may be compared with data received from the first and/or second tray sensors 894, 895 to confirm the relative position of the tray conveyor 865 and the first and second trays 885A, 885B. The data from the various sensors may also be used to calibrate the other sensors.

Figure 9:
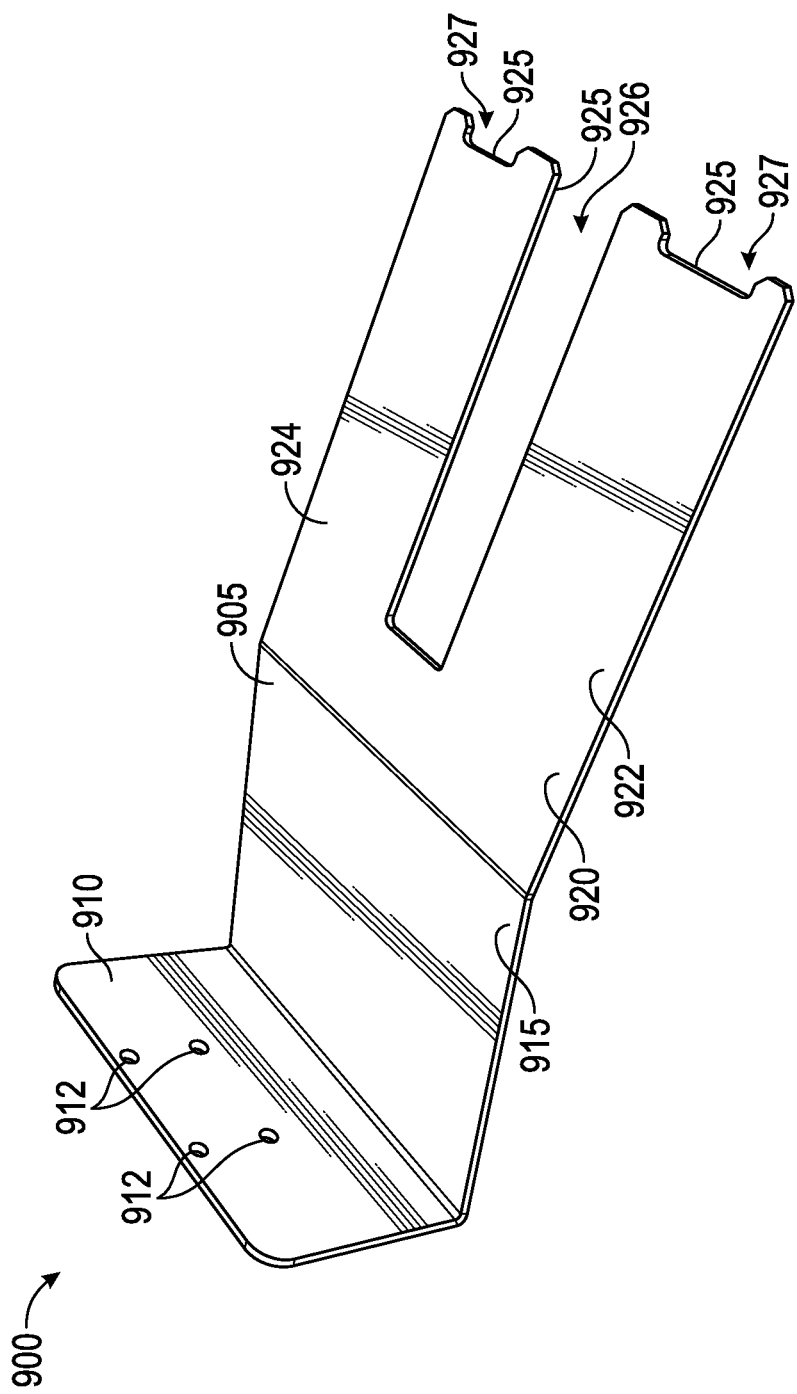
FIG. 9 is a perspective view of an embodiment of a guide paddle that may be used with the systems of FIGS. 1A, 1B, 2 and 3.

FIG. 9 is a perspective view of an embodiment of a guide paddle 900. The guide paddle 900 may have the same or similar features as the guide paddles described herein, for example the guide paddle 180, 280 or 880, and vice versa. The guide paddle 900 may be used to guide items injected from an item conveyor into a tray on a tray conveyor, such as the items 230 injected from the item conveyor 220 into the first tray 285A on the tray conveyor 265.

The guide paddle 900 may include a body 905. The body 905 may be an elongated, plate-like structure formed from a variety of rigid or semi-rigid materials, such as plastics, polymers, metals or metal alloys, composites, other suitable materials, or combinations thereof. The body 905 may have various segments. As shown, the body 905 may include an attachment segment 910. The attachment segment 910 may be a flat, planar segment on an end of the paddle 900. The attachment segment 910 may include one or more openings 912 extending through the attachment segment 910. The openings 912 may allow for the paddle 900 to be attached to various structures, such as the supporting structure 175 or the arm 881, or a rod of a pneumatic actuator. In some embodiments, fasteners may be inserted through the openings 912 to attach the paddle 900 to the corresponding features of the various structures.

The body 905 may include a first segment 915. The first segment 915 may be a flat, planar portion of the paddle 900. The first segment 915 may be attached to or otherwise coupled with an end of the attachment segment 910. In some embodiments, the first segment 915 and the attachment segment 910 may be formed from the same monolithic piece of material. The attachment and first segments 910, 915 may be angularly oriented with respect to each other, for example at a seventy-five degree (75°) angle.

The body 905 may include a second segment 920. The second segment 920 may be a flat, planar portion of the paddle 900. The second segment 920 may be attached to or otherwise coupled with an end of the first segment 915. The second segment 920 may be coupled with an opposite end of the first segment 915 as that of the attachment segment 910. In some embodiments, the first segment 915 and the second segment 920 may be formed from the same monolithic piece of material. The first and second segments 915, 920 may be slightly angularly oriented with respect to each other. In some embodiments, the second segment 920 may be perpendicular to the attachment segment 910.

The second segment 920 may include a first tab 922 and/or a second tab 924. The tabs 922, 924 may be elongated sides of the second segment 920 forming a fork shape. The second segment 920 may have an outer edge 925 extending along an outer perimeter of the second segment 920. A portion of the outer edge 925 along the ends of the first and second tabs 922, 924 may be recessed to form indentations 927. The indentations 927 may be generally rectangular recesses in the tabs 922,924. The indentations 927 may facilitate injecting of items into a tray. In some embodiments, indentations 927 may prevent the items from getting in between the edges of the paddle around the indentations 927 and the bottom side of the tray, such as bottom side 791. In some embodiments, the indentations 927 may provide a mating feature for securing the guide paddle 900. In some embodiments, there may be corresponding or complementary features inside a tray, such as the tray 785, that mate with or otherwise secure the guide paddle 900 therein and allow for the guide paddle 900 to move inside the tray in a controlled manner.

Various portions of the body 905 may be rigid. For instance, the first and/or second segment 915, 920 may not flex in response to deflecting items therefrom. Items may be injected from an item conveyor and deflect off of the guide paddle 900 and into a tray on a tray conveyor. In some embodiments, the first segment 915 may not rotate relative to the attachment segment 910 and/or the second segment 920. In some embodiments, the second segment 920 may not rotate relative to the first segment 915. Further, the first and/or second segments 915, 920 may not bend. In some embodiments, the body 905 may be flexible such that the various features may flex or bend relative to each other. Such features may provide damping to the system and allow for softer receipt of the items and thus less stress on the tray and or tray conveyor over the lifetime of the processing system. Therefore, the body 905 may have a variety of suitable characteristics.

The paddle 900 may include an opening or openings such as the slot 926. The outer edge 925 may define the slot 926. The slot 926 may be formed in between the first tab 922 and the second tab 924. The slot 926 may complement the shape of structures inside the trays. In some embodiments, the first tab 922 and the second tab 924 may be symmetric with respect to the slot 926. In some embodiments, the slot 926 may be centered with respect to portions of the edge 925 along the inside edges of the first and second tabs 922, 924. In some embodiments, the first tab 922 and the second tab 924 may not be symmetric with respect to the slot 926. The slot 926 may extend for a majority of the length of the second segment 920. In some embodiments, the slot 926 may extend for longer or short lengths of the second segment 920. The slot 926 may have the generally rectangular shape as shown. In some embodiments, the slot 926 may have other shapes, such as square, rounded, other suitable shapes, or combinations thereof. Further, the slot 926 need not be a continuous opening through the second segment 920. In some embodiments, the slot 926 may include multiple openings extending through the second segment 920. For instance, the slot 926 may include a grid-like configuration of openings through the second segment 926. Further, the slot 926 need not extend to an outer edge of the body 905. In some embodiments, the slot 926 may be an opening or openings enclosed on the interior of the second segment 920.

The slot 926 may allow for a transmission from a sensor to extend therethrough. In some embodiments, the slot 926 may allow an electromagnetic transmission from a stack sensor, such as the transmission 393 from the stack sensor 292 or 392, to extend therethrough. The slot 926 may allow for such transmissions to detect the height of a stack of items while the guide paddle 900 is extended into a tray. For instance, the guide paddle 900 may be extended into the first tray 285A and allow for transmissions from the stack sensor 292 to extend through the slot 926 and detect the height of the stack 290 of items inside the tray.

Figure 10:
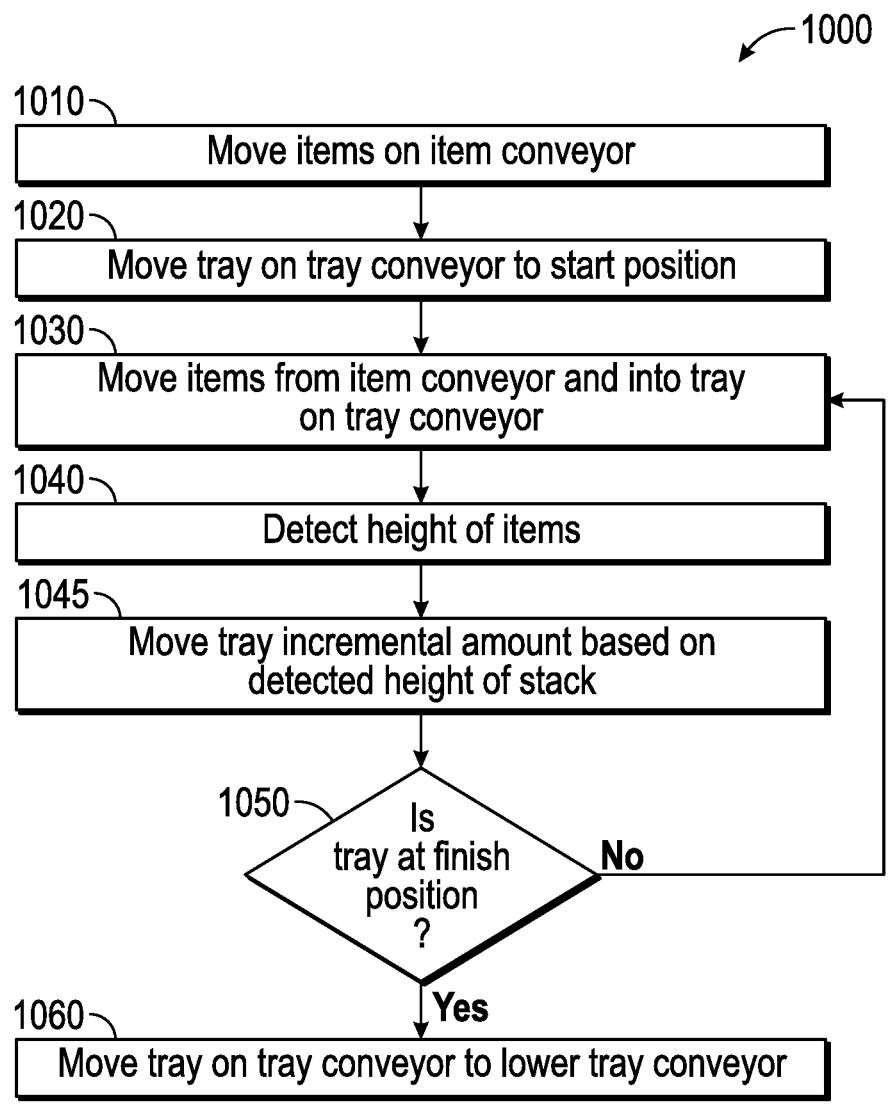
FIG. 10 is a flowchart showing an embodiment of a method that may be used to load items into a tray.

FIG. 10 is a flowchart of an embodiment of a method 1000 for loading items into a tray. The method 1000 may be performed by the various systems described herein, for example the system 100, 200, or 300. While various blocks or steps of the method 100 may be described in a specified sequential order, it is understood that the blocks may be performed in another order, and/or some of the blocks may happen in parallel with each other. Thus, the order of performing the various methods described herein is not limited to the particular order in which they are described.

The method 1000 begins with block 1010 wherein items are moved on an item conveyor. In some embodiments, the items may be conveyed on a belt of the item conveyor. For example, the items 230 may be moved on the belt 224 of the item conveyor 220. In some embodiments, the item conveyor may be moved by the various actuators described herein. For example, the item conveyor 220 may be moved using the item actuator 226.

The method 1000 then moves to block 1020 wherein one or more trays are moved on a tray conveyor. The trays may be moved to a start position, such as the start position as described with respect to FIG. 8A or 8B. Further, the trays may be moved onto the tray conveyor from another conveyor. For example, the trays may be moved from the upper tray conveyor 160 to the tray conveyor 165. In block 1020, in some embodiments, the trays may be moved on a belt of the tray conveyor, which may be in a controlled fashion. For example, the trays 285A, 285B may be moved on the belt 267 of the tray conveyor 265. As further example, the tray 385 may be moved on a tray conveyor and controlled by the controller 395. The tray conveyor may be moved using the various actuators described herein. For example, the tray conveyor 265 may be moved using the tray actuator 269. In some embodiments, block 1020 may be performed in parallel with block 1010. In some embodiments, block 1020 may be performed before block 1010. In some embodiments, block 1020 may be performed before and during block 1010. In some embodiments, block 1020 may be performed before, during and after block 1010.

The method 1000 then moves to block 1030 wherein the items are moved from an item conveyor and into a tray on a tray conveyor. In some embodiments, the items may be injected from the item conveyor and into the tray on the tray conveyor. For example, the injector 240 of the item conveyor 220 may inject the items 230 into the first tray 285A on the tray conveyor 265. In some embodiments, block 1030 may be performed in parallel with blocks 1010 and/or 1020.

The method 1000 then moves to block 1040 wherein the height or heights of the items is/are detected. In some embodiments, the height of the items may be detected on the item conveyor. For example, the item sensor 246 may detect the height of items 230 on the item conveyor 220. In some embodiments, the height of items in a stack in the tray on the tray conveyor may be detected. For example, the stack sensor 292 may detect the height of the stack 290 inside the first tray 285A. As mentioned, "detecting the height" may include detecting the distance to the items from the item sensor. For instance, the item sensor 246 may detect the distance to the top item 230 in the stack of items in the tray. In some embodiments, block 1040 may be performed in parallel with blocks 1010, 1020 and/or 1030.

In some embodiments, block 1040 may also include determining whether the height or distance to the items is at a desired height or distance. In some embodiments, a desired height for a stack of items may be pre-determined. In some embodiments, the detected height of items in block 1040 may be compared to the desired height to determine whether the height of the items are at the desired height. In some embodiments, the height of items on an item conveyor may be used to determine whether the height of items is at the desired height. For example, the height of the items 230 on the item conveyor 220 may be used. In some embodiments, the height of items in a stack inside a tray may be used to determine if the height of the items are at a desired height. For example, the height of the items 230 in the stack 290 may be used. In some embodiments, block 1040 may be performed in parallel with blocks 1010, 1020, 1030, 1040 and/or 1045.

The method 1000 then moves to block 1045 wherein the tray is moved an incremental amount based on the detected height of (or distance to) the stack of items in the tray. The tray may be moved in order to accommodate the increase in height of the stack of items in the tray. The tray may be moved a distance that is commensurate with the increase in height of the stack of items in the tray. In some embodiments, the tray may be moved a distance that is equal to the increase in the height of the stack, described in further detail herein, for example with respect to FIG. 11A. In some embodiments, the tray may be moved a distance that is not equal to the increase in the height of the stack, described in further detail herein, for example with respect to FIG. 11A. In some embodiments, block 1045 may be skipped if the detected height or distance is less than a threshold amount, as described in further detail herein, for example with respect to FIG. 11A. For example, if it is determined in block 1040 that the detected increase in height of the stack is less than a threshold height, then block 1045 may be skipped. In some embodiments, block 1045 may be performed in parallel with blocks 1010, 1020, 1030 and/or 1040.

The method 1000 then moves to decision block 1050 wherein it is determined if the tray is at the finish position. The finish position may be, for example, the position of the first tray 885A as shown in FIG. 8D. It may be determined whether the tray is at the finish position by using the tray sensors, for example the first tray sensor 894 and the second tray sensor 895. In some embodiments, it may be determined that the tray is at the finish position if the forward tray sensor detects the presence of the tray and the rearward tray sensor detects the absence of the tray. For instance, it may be determined that the first tray 885A is at the finish position if the first tray sensor 894 detects the presence of the tray 885A and the second tray sensor 895 detects the absence of the tray 885A, as shown for example in FIG. 8D. In some embodiments, it may be determined that the tray is not at the finish position if the forward tray sensor detects the presence of the tray and the rearward tray sensor detects the presence of the tray. For instance, it may be determined that the first tray 885A is not at the finish position if the first tray sensor 894 detects the presence of the tray 885A and the second tray sensor 895 detects the presence of the tray 885A, as shown for example in FIGS. 8A-8C.

If it is determined in decision block 1050 that the tray is not at the finish position, then the method 1000 moves back to block 1030 and proceeds as described above. If it is determined in decision block 1050 that the tray is at the finish position, the method 1000 then moves to block 1060.

At block 1060, a tray having the desired height of items therein is moved on a tray conveyor. In some embodiments, the tray with the desired height of items may be moved on a belt of the tray conveyor. For example, the first tray 285A may have a full stack 290 of the items 230 therein and may be moved on the belt 267 of the tray conveyor 265. In some embodiments, the tray conveyor may be moved using various actuators. For example, the tray actuator 269 may be used to move the tray conveyor 265.

Figure 11A:
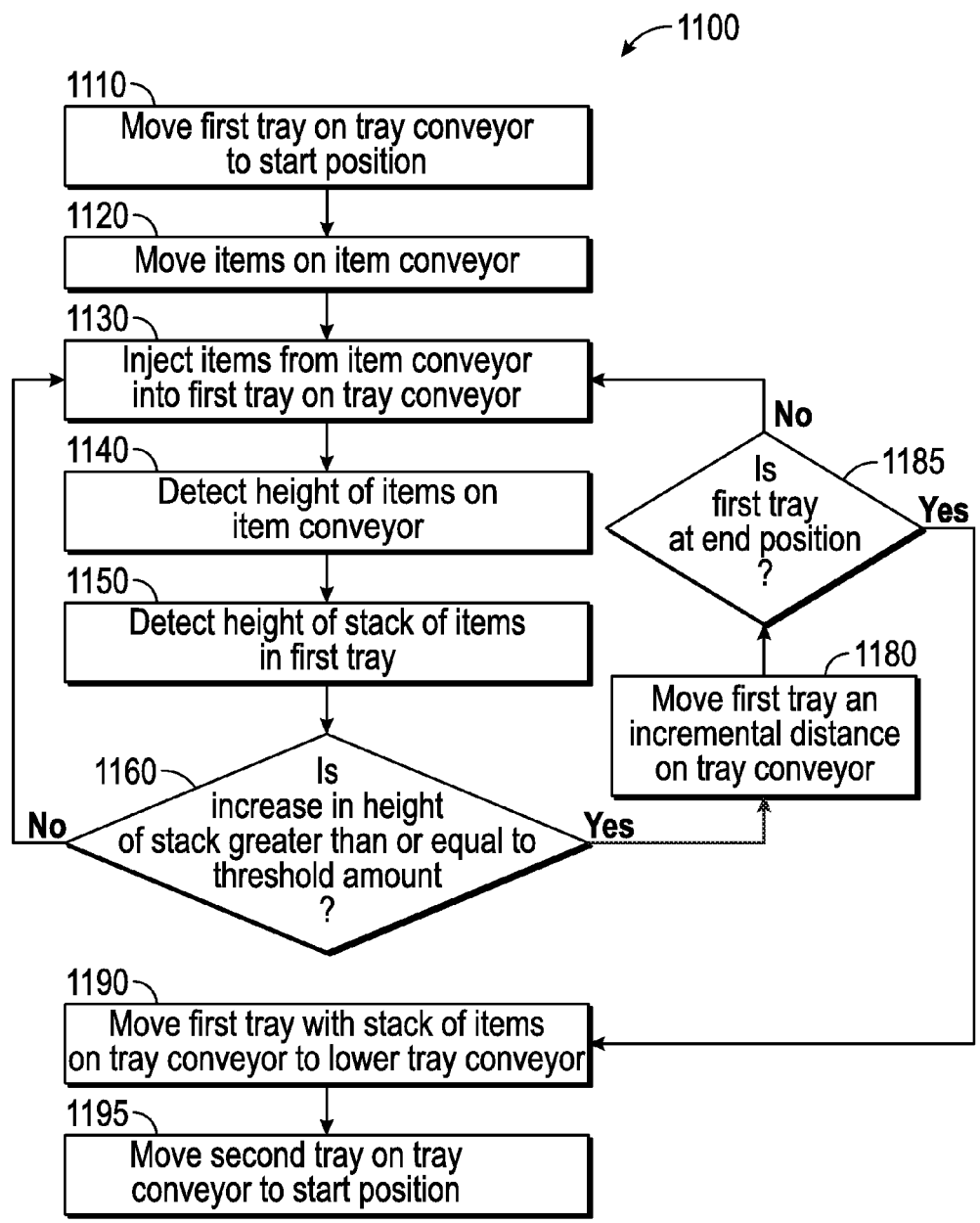
FIG. 11A is a flowchart showing another embodiment of a method that may be used to load items into a tray.

FIG. 11A is a flowchart of an embodiment of a method 1100 for loading items into a tray. The method 1100 may be performed by the various systems described herein, for example the system 100, 200, or 300.

The method 1100 begins with block 1110 wherein a first tray on a tray conveyor is moved to a start position. The block 1110 of the method 1100 may have the same or similar features as the block 1020 of the method 1000 shown in FIG. 10, and vice versa. In some embodiments, a first tray may be moved on a belt of the tray conveyor to the start position. For example, the first tray 885A may be moved on the tray conveyor 865 to the start position, which may be the position of the first tray 885A shown in FIG. 8A.

The method 1100 then moves to block 1120 wherein one or more items is/are moved on an item conveyor. The block 1120 of the method 1100 may have the same or similar features as the block 1010 in the method 1000 shown in FIG. 10, and vice versa. In some embodiments, blocks 1110 and 1120 may be performed in parallel.

The method 1100 then moves to block 1130 wherein one or more items is/are injected from an item conveyor and into a first tray on a tray conveyor. The block 1130 of the method 1100 may have the same or similar features as the block 1030 of the method 1000 shown in FIG. 10. In some embodiments, the items 230 may be injected by the injector 240 into the first tray 285A on the tray conveyor 265.

The method 1100 then moves to block 1140 wherein the height or heights of one or more items on an item conveyor is/are detected. In some embodiments, the height of items on an item conveyor may be detected as the items move on a belt of the item conveyor. For example, the height of the items 230 in the shingled arrangement 229 may be detected as the items 230 are moved on the item conveyor 220. In some embodiments, an item sensor may detect the height of the items on the item conveyor as the items move past the item sensor on the item conveyor. For example, the item sensor 246 may detect the height of the items 230 in the shingled arrangement 229 as the items 230 move on the belt 224 of the item conveyor 220. In some embodiments, the height of the items may be detected at various sections of an item conveyor. For example, the height of the items 230 may be detected at the injector 240. Alternatively or in addition, the height of the items may be detected at other sections of the item conveyor, for example at the low-speed section 222 and/or at the high-speed section 236 of the item conveyor 220. In some embodiments, the detected height of the items on the item conveyor may be plotted for analysis of the collected data. For example, the item sensor 546 may be used to detect the height of the items 530 moving on the item conveyor 520 and the detected data may be plotted in the plot 600.

The method 1100 then moves to block 1150 wherein the height of a stack of items in a first tray is detected. In some embodiments, the height of a stack of items in the first tray may be detected by a stack sensor. For example, the stack sensor 292 may detect the height of the stack 290 of the items 230 inside the first tray 285A. The detected height of the stack of items may be plotted and analyzed as described herein, for example in the plot 600.

The method 1100 then moves to decision block 1160 wherein it is determined whether the increase in the height of the stack is greater than or equal to a threshold amount. This may include determining whether a decrease in the detected distance to the stack is less than or equal to a threshold distance. In some embodiments, the increase in the height of the stack is determined and then compared to a predetermined threshold amount of increase in height. For example, the stack sensor 392 may detect the height of the stack 390 and the controller 395 may compare the detected height of the stack 390 to a predetermined threshold amount of increase in height.

In some embodiments, decision block 1160 may include determining if the height of a stack of items is at a desired height. In some embodiments, the height of the stack of items is determined to be at a desired height using the height data detected by the item sensor and/or by the stack sensor. For example, the height of the items 230 on the item conveyor 220 detected by the item sensor 246, and the height of the stack 290 inside the first tray 285A detected by the stack sensor 292, may be compared with a desired height. In some embodiments, a controller may receive the detected height data and compare it to a desired height. For example, the controller 395 may receive height data from the item sensor 346 and/or from the stack sensor 392 and compare it to a predetermined desired height for the stack 390. In some embodiments, the controller 395 may have a processor configured to execute a set of instructions to make such comparisons. It is understood that determining a "height" may also refer to determining a "distance," as described herein.

In some embodiments, decision block 1160 may include both determining whether the increase in the height of the stack is greater than or equal to a threshold amount as well as determining if the height of a stack of items is at a desired height. Therefore, a variety of data regarding the height of the items may be determined.

If it is determined in decision block 1160 that the increase in the height of the stack is not greater than or equal to a threshold amount, and/or that the height of the stack of items is not at the desired height, then the method 1100 moves back to block 1130 and proceeds as described above. If it is determined in decision block 1160 that the increase in the height of the stack is greater than or equal to a threshold amount, and/or that the height of the stack is at the desired height or is greater than the desired height, then the method 1100 moves to block 1180.

At the block 1180, a first tray is moved an incremental distance on a tray conveyor. Block 1180 may have the same or similar features as the block 1045 in FIG. 10, and vice versa. In some embodiments, a first tray may be moved an incremental distance on a tray conveyor by the various actuators described herein. For example, the tray actuator 269 may move the tray conveyor 265 an incremental distance such that the first tray 285A also moves the corresponding incremental distance on the belt 267 of the tray conveyor 265. After the block 1180, the method 1100 may then move to the decision block 1185.

At the decision block 1185, it may be determined whether the first tray is at the end or finish position. Block 1185 may have the same or similar features as the decision block 1050 in FIG. 10, and vice versa. If it is determined in decision block 1185 that the tray is not at the finish position, then the method 1100 moves back to block 1130 and proceeds as described above. If it is determined in decision block 1185 that the tray is at the finish position, the method 1000 then moves to block 1090.

At the block 1190, a first tray with the stack of items therein is moved on a tray conveyor to a location other than the finish position, such as the lower tray conveyor. In some embodiments, the first tray with the stack of items therein may be moved on the tray conveyor to another location for further processing. For example, the first tray 285A with the stack 290 of the items 230 therein may move on the tray conveyor 265. As further example, the first tray 885A may move in the tray direction 18 along the tray conveyor 865. In some embodiments, the first tray with a stack of items on the tray conveyor may be moved to another tray conveyor. For example, the tray 185 may be moved on the tray conveyor 165 to the lower tray conveyor 170.

The method 1000 then moves to block 1195 wherein a second tray on the tray conveyor is moved to the start position. In some embodiments, the second tray may move on the tray conveyor as the first tray is moved on the tray conveyor. For example, the second tray 285B may move on the tray conveyor 265 to the start position to begin receiving items 230 therein. In some embodiments, the first and second trays 285A, 285B may move together along the tray conveyor 265.

Figure 11B:
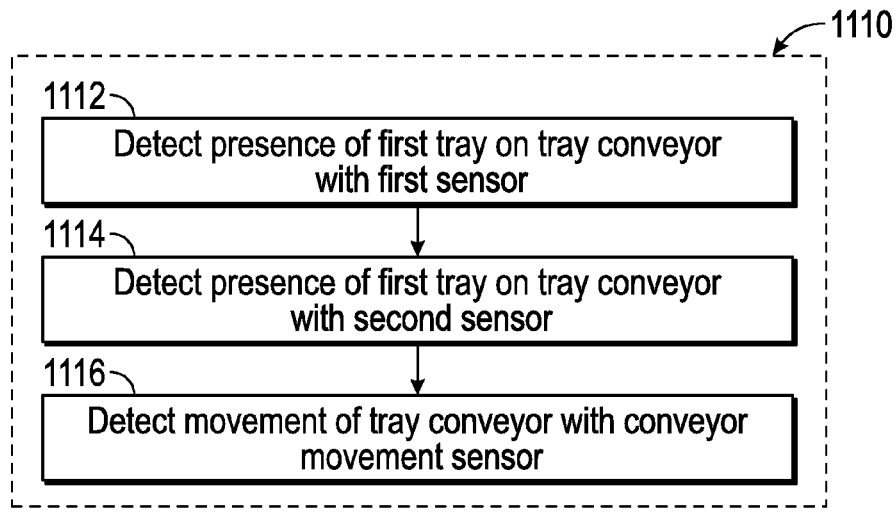
FIGS. 11B-11K are flowcharts showing embodiments of methods that may be used with the method of FIG. 11A to load items into a tray.

FIG. 11B is a flowchart of an embodiment of the block 1110 from the method 1100 shown in FIG. 11A. As shown in FIG. 11B, the block 1110 begins with the sub-block 1112 wherein the presence of a first tray on a tray conveyor is detected with a first sensor. In some embodiments, the presence of the first tray may be detected with the first sensor as the first tray moves on a belt of the tray conveyor. For example, the first tray sensor 894 may detect the presence of the first tray 885A on the tray conveyor 865. In some embodiments, the first tray sensor 894 may detect the presence of the front sidewall 887A of the first tray 885A. The block 1110 then moves to sub-block 1114 wherein the presence of the first tray on the tray conveyor is detected with a second sensor. In some embodiments, the presence of the first tray on the tray conveyor may be detected with the second sensor as the tray moves on a tray conveyor. For example, the second tray sensor 895 may detect the first tray 885A as it moves on the tray conveyor 865. The block 1110 then moves to sub-block 1116 wherein movement of the tray conveyor may be detected with a conveyor movement sensor. In some embodiments, movement of the tray conveyor is detected with the conveyor movement sensor as the tray conveyor moves a tray thereon. For example, the conveyor movement sensor 896 may detect movement of the first tray 885A on the tray conveyor 865. In some embodiments, the conveyor movement sensor 896 may track the position of the tray conveyor 865 as the tray conveyor 865 moves.

Figure 11C:
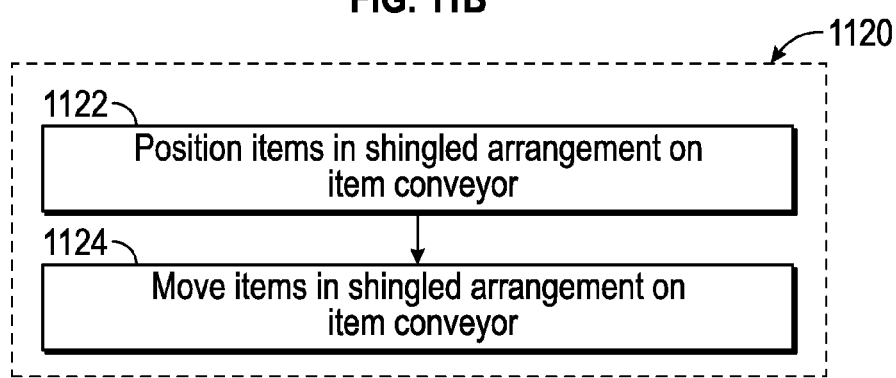

FIG. 11C is a flowchart of an embodiment of the block 1120 from the method 1100 shown in FIG. 11A. As shown in FIG. 11C, the block 1120 begins with sub-block 1122 wherein items are positioned in a shingled arrangement on an item conveyor. In some embodiments, the items may be positioned in the shingled arrangement on the item conveyor manually or using automated machines. In some embodiments, in block 1122 the items may be received in a bundled arrangement and thereafter positioned in the shingled arrangement. For example, the items 230 may be positioned in the shingled arrangement 229 on the item conveyor 220. As further example, the items 430 may be arranged in the shingled arrangement 429 on the item conveyor 420. The block 1120 then moves to sub-block 1124 wherein the items in the shingled arrangement may be moved on an item conveyor. In some embodiments, the items in the shingled arrangement are moved on the item conveyor using the various actuators described herein. For example, the item actuator 226 may move the shingled arrangement 229 on the item conveyor 220 in the feed direction 16.

Figure 11D:
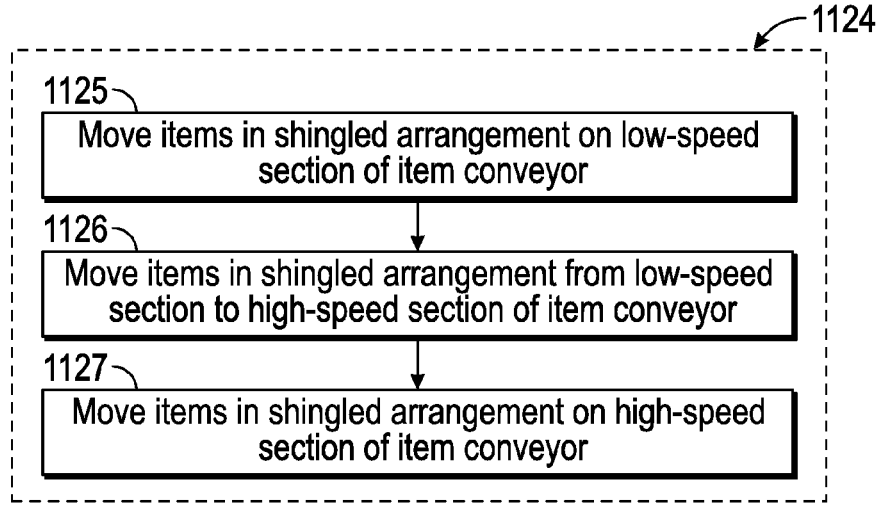

FIG. 11D is a flowchart of an embodiment of the block 1124 from FIG. 11C. As shown in FIG. 11D, the block 1124 begins with sub-block 1125 wherein the items may be moved in the shingled arrangement on a low-speed section of the item conveyor. For example, the items 230 may be moved in the shingled arrangement 229 on the low-speed section 222 of the item conveyor 220. The block 1124 then moves to sub-block 1126 wherein the items in the shingled arrangement may be moved from the low-speed section to a high-speed section of the item conveyor. For example, the items 230 in the shingled arrangement 229 may be moved from the low-speed section 222 to the high-speed section 236 of the item conveyor 220. The method 1124 then moves to block 1127 wherein the items in the shingled arrangement are moved on the high-speed section of the item conveyor. For example, the items 230 in the shingled arrangement 229 maybe moved on the high-speed section 236 of the item conveyor 220.

Figure 11E:
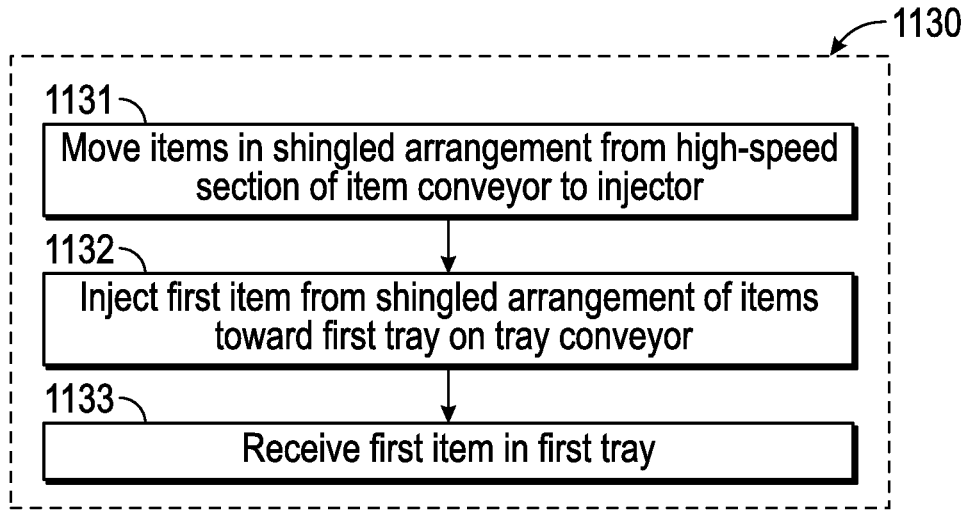

FIG. 11E is a flowchart of an embodiment of the block 1130 from FIG. 11A. As shown in FIG. 11E, the block 1130 begins with sub-block 1131 wherein the items in a shingled arrangement may be moved from the high-speed section of the item conveyor to an injector. For example, the items 230 in the shingled arrangement 229 may be moved from the high-speed section 236 to the injector 240 of the item conveyor 220. The block 1130 then moves to sub-block 1132 wherein a first item from the shingled arrangement of items may be injected toward a first tray on a tray conveyor. In some embodiments, the first item from the shingled arrangement of items may be sandwiched, compressed or otherwise surrounded by the injector and propelled toward the first tray on the tray conveyor. For example, the injector 240 may inject one of the items 230 toward the first tray 285A on the tray conveyor 265. As further example, the top belt 242 and the bottom belt 244 of the injector 240 may contact top and bottom surfaces, respectively, of one of the items 230 from the shingled arrangement 229 and inject that item 230 toward the first tray 285A. The block 1130 then moves to sub-block 1133 wherein a first item may be received in a first tray. For example, the item 230 injected from the injector 240 toward the first tray 285A may be received inside the first tray 285A. In some embodiments, the item 230 received in the first trade 285A may form the stack 290 therein.

Figure 11F:
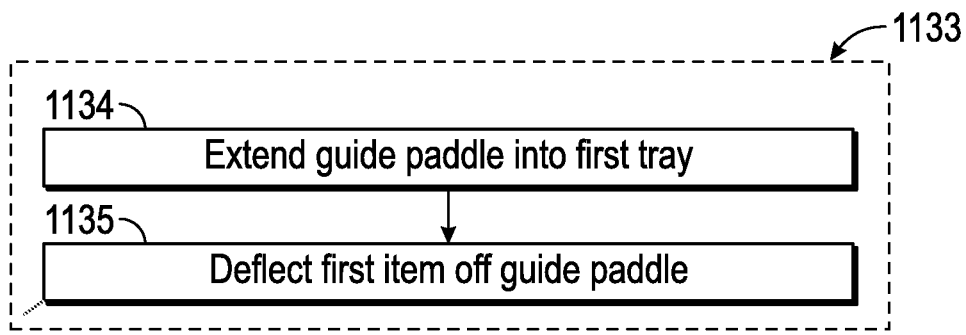

FIG. 11F is a flowchart of an embodiment of the block 1133 shown in FIG. 11E. As shown in FIG. 11F, the block 1133 begins with the sub-block 1134 wherein a guide paddle may be extended into the first tray. In some embodiments, the guide paddle may be extended from outside the first tray into an interior of the first tray. For example, the guide paddle 280 may be extended into the first tray 285A, and it may result in the configuration shown in FIG. 2. As further example, the arm 881 may extend the guide paddle 880 into the first tray 885A, and it may result in the configuration shown in FIG. 8B. The block 1133 then moves to sub-block 1135 wherein a first item deflects off the guide paddle. In some embodiments, the first item may be propelled through the air and deflected off of the guide paddle. For example, one of the items 230 injected from the injector 240 may deflect off the guide paddle 280 and settle onto the stack 290. In some embodiments, the guide paddle 900 may be used in the sub-block 1135 and/or in the sub-block 1134.

Figure 11G:
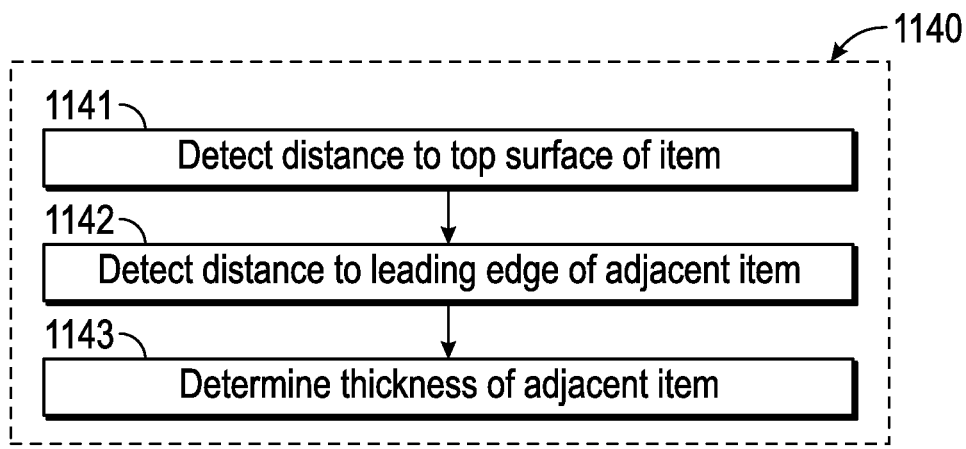

FIG. 11G is a flowchart of an embodiment of the block 1140 from FIG. 11A. As shown in FIG. 11G, the block 1140 begins with sub-block 1141 wherein the distance to a top surface of an item is detected. In some embodiments, the distance along the top surface of an item may be detected by an item sensor. For example, the item sensor 246 may detect the distance to a top surface of one of the items 230. As further example, the item sensor 546 may detect the distance to the top surface 531B of the second item 530B. In some embodiments of the sub-block 1141, multiple distances to the top surface of the item may be detected. For example, the item sensor 546 may detect the distance to the top surface 531B of the second item 530B as the second item 530B moves past the item sensor 546. The detected distances may be plotted, for example in the plot 600.

The block 1140 then moves to sub-block 1142 wherein the distance to a leading edge of an adjacent item is detected and/or calculated. In some embodiments, the distance may be detected to the leading edge of the next item in an arrangement of items on an item conveyor. For example, the item sensor 546 may detect the distance to the leading edge 532A of the first item 530A. The distance detected to the leading edge of the item may be plotted, for example in the plot 600.

The block 1140 then moves to sub-block 1143 wherein the thickness of the adjacent item may be determined. In some embodiments, the distances detected in sub-blocks 1141 and 1142 may be used in sub-block 1143 to determine the thickness of the adjacent item. For example, the item sensor 546 may detect the distance to the top surface 531B of the second item 530B and the distance to the leading edge 532A of the adjacent first item 530A to determine the thickness of the first item 530A. The determined thickness in block 1143 may be an approximation of the thickness of the item based on the detected distances. For example, the detected and/or computed distance δ may be used as an approximation of the thickness of the first item 530A, as described herein, for example with respect to FIG. 5.

Figure 11H:
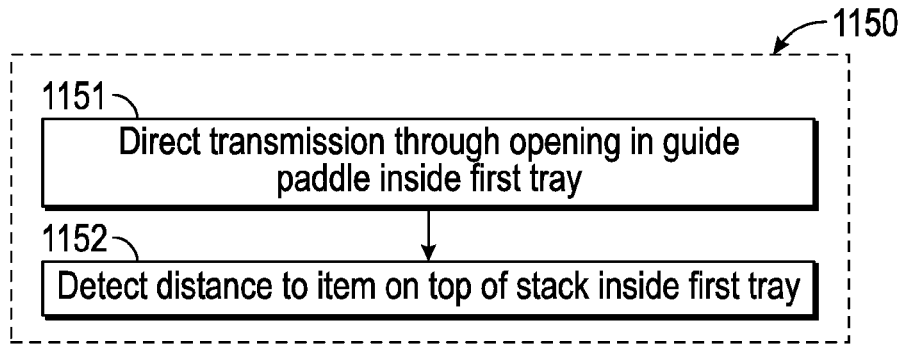

FIG. 11H is a flowchart of an embodiment of the block 1150 from FIG. 11A. As shown in FIG. 11H, the block 1150 begins with sub-block 1151 wherein a transmission is directed through an opening in a guide paddle that is inside a first tray. In some embodiments, the transmission may be from a sensor wherein the transmission may extend through the opening in the guide paddle while the guide paddle is extended into the first tray. For example, the stack sensor 292 may direct a transmission through an opening in the guide paddle 280 inside the first tray 285A. In some embodiments, the stack sensor 292 may direct the transmission through the slot 926 of the guide paddle 900. In some embodiments of sub-block 1151, the stack sensor 392 may direct the transmission 393 through openings in the guide paddle and toward the stack 390 inside the tray 385. The block 1150 then moves to sub-block 1152 wherein the distance to an item on the top of the stack inside the first tray is detected. In some embodiments, the distance to the item on the top of the stack inside the first tray may be detected with the transmission from the stack sensor. For example, the stack sensor 392 may direct the transmission 393 onto the top item 330 of the stack 390 inside the tray 385.

Figure 11I:
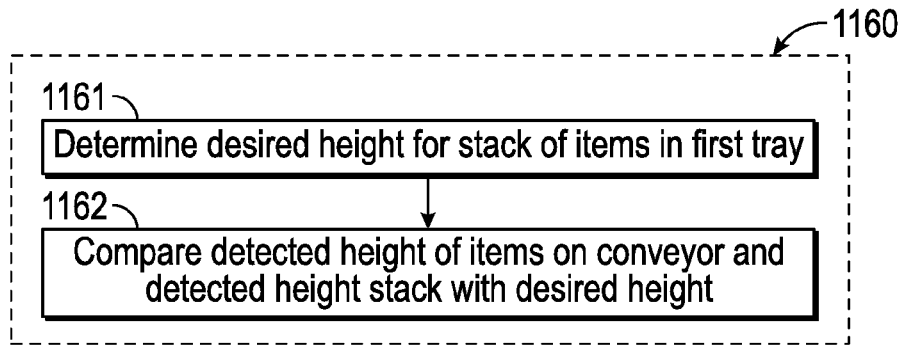

FIG. 11I is a flowchart of an embodiment of the decision block 1160 from FIG. 11A. As shown in FIG. 11I, the decision block 1160 begins with sub-block 1161 wherein a desired height for a stack of items in a first tray is determined. In some embodiments, the desired height for the stack of items in the first tray may be the amount or volume of items desired to be put into the first tray before the first tray is moved along a tray conveyor for further processing. In some embodiments, the desired height of the stack of items in the first tray may be indicative of a full load of items in the first tray. For example, the tray 785 may have a distance between the front sidewall 787 and the rear sidewall 788 of about thirteen inches (13"). Therefore, the desired height for the stack 790 of the items 730 inside the tray 785 may be less than thirteen inches (13") in order to ensure the items 730 can fit inside the tray 785. In some embodiments, the desired height for the stack 790 of the items 730 inside the tray 785 may be about ten inches (10"). Thus, the desired height of a stack of items in the first tray in sub-block 1161 may be based on various dimensions of the first tray.

The decision block 1160 then moves to sub-block 1162 wherein the detected height of items on an item conveyor and the detected height of a stack of items in a tray may be compared with a desired height. In some embodiments, the detected height of a stack of items in a tray and detected height of items moving on an item conveyor may be compared with the desired height determined in the sub-block 1161. For example, the item sensor 346 may detect the height of the item 330 and the stack sensor 392 may detect the height of the stack 390, and such data may be sent to the controller 395 for comparison with the pre-determined desired height of the stack 390.

Figure 11J:
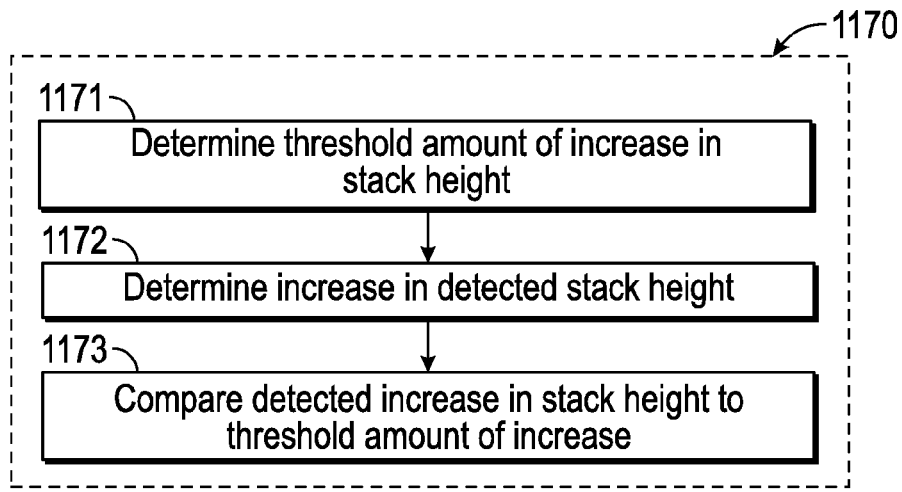

FIG. 11J is a flowchart of an embodiment of a decision block 1170 that may be used for the decision block 1160 in FIG. 11A. As shown in FIG. 11J, the decision block 1170 begins with sub-block 1171 wherein a threshold amount of increase in the stack height is determined. In some embodiments, the threshold amount of increase in the stack height is an allowable incremental increase in the height of the stack of items. For example, with each additional item 330 moved on top of the stack 390, the stack 390 may increase in height by an amount approximately equal to the thickness of each additional item 330, and the allowable incremental increase in height may be multiples of that thickness.

The decision block 1170 then moves to sub-block 1172 wherein the increase in the detected height of the stack may be determined. In some embodiments, the height of the stack 390 may be determined with the stack sensor 392 and/or the controller 395. With each additional item 330 moved on top of the stack 390, the stack 390 may increase in height by an incremental amount. Thus, for example, the stack sensor 392 may detect this incremental increase in height and send data related thereto to the controller 395.

The decision block 1170 then moves to sub-block 1173 wherein the detected increase in the height of the stack may be compared to the threshold amount of increase. In some embodiments, the threshold amount of increase in the stack height determined in the sub-block 1171 is compared to the increase in the detected height of the stack determined in the sub-block 1172.

Figure 11K:
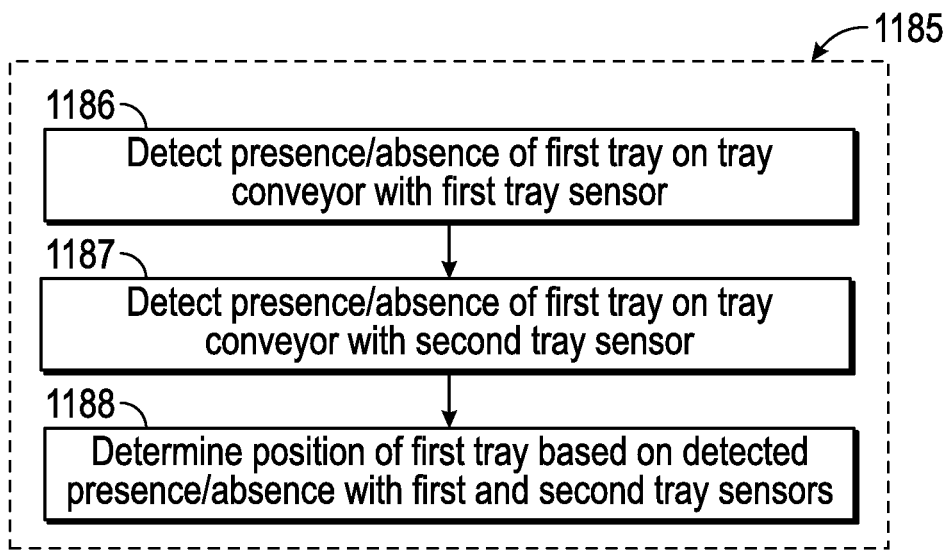

FIG. 11K is a flowchart of an embodiment of the decision block 1185 from FIG. 11A. As shown in FIG. 11K, the decision block 1185 begins with sub-block 1186 wherein the presence or absence of a first tray is detected on the tray conveyor with a first tray sensor. In some embodiments, the first tray sensor may be the forward-most tray sensor among a plurality of tray sensors. For example, the first tray sensor 894 may be located ahead of another tray sensor or sensors on the tray conveyor 865 to detect the presence or absence of the first tray 885A.

The decision block 1170 then moves to sub-block 1187 wherein the presence or absence of a first tray is detected on the tray conveyor with a second tray sensor. In some embodiments, the second tray sensor may be the rearward-most tray sensor among a plurality of tray sensors. For example, the second tray sensor 895 may be located behind another tray sensor or sensors on the tray conveyor 865 to detect the presence or absence of the first tray 885A.

The decision block 1170 then moves to sub-block 1188 wherein the position of the first tray is determined based on the detected presence or absence of the first tray with the plurality of tray sensors, such as with the first and second tray sensors. Sub-block 1188 may have the same or similar features as the decision block 1050 in the method 1000 described with respect to FIG. 10.

In some embodiments, it may be determined in the sub-block 1188 that the tray is rearward of the starting position. For instance, the first tray sensor 894 may detect the absence of the first tray 885A, and the second tray sensor 895 may detect the presence of the first tray 885A by switching from clear to blocked.

In some embodiments, it may be determined that the tray is at the starting position. For instance, the first tray sensor 894 may detect the presence of the first tray 885A by switching from clear to blocked, and the second tray sensor 895 may still detect the presence of the first tray 885A.

In some embodiments, it may be determined that the tray is in between the starting and finish positions. For instance, the first tray sensor 894 may still detect the presence of the first tray 885A, and the second tray sensor 895 may still detect the presence of the first tray 885A.

In some embodiments, it may be determined that the tray is at the finish position. For instance, the first tray sensor 894 may still detect the presence of the first tray 885A, and the second tray sensor 895 may detect the absence of the first tray 885A by switching from blocked to clear. The finish position may be, for example, the position of the first tray 885A as shown in FIG. 8D, and/or as described with respect to block 1185 of FIG. 11A and/or the block 1050 of FIG. 10.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those skilled in the art that parts included in one embodiment are interchangeable with other embodiments; one or more parts from a depicted embodiment may be included with other depicted embodiments in any combination. For example, any of the various components described herein and/or depicted in the figures may be combined, interchanged or excluded from other embodiments.

The processes or steps of any flow charts described and/or shown herein are illustrative only. A person of skill in the art will understand that the steps, decisions, and processes embodied in the flowcharts described herein may be performed in an order other than that described herein. Thus, the particular flowcharts and descriptions are not intended to limit the associated processes to being performed in the specific order described.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A system for loading items into a tray, the system comprising:
    an item conveyor extending in a first direction toward a first end and configured to move a plurality of items along the item conveyor in the first direction toward the first end and to inject into a tray one or more of the plurality of items from the first end of the item conveyor;
    a tray conveyor extending generally downward in a second direction that intersects the first direction near the first end of the item conveyor, the tray conveyor configured to move a tray downward on the tray conveyor in the second direction, wherein the tray is configured to receive one or more of the plurality of items injected from the item conveyor;
    a sensor configured to detect a height of at least one of the plurality of items; and
    a controller communicatingly coupled with the item conveyor, the tray conveyor and the sensor, wherein the controller is configured to control movement of the item and the tray conveyors based on the height of at least one of the plurality of items detected by the sensor;
    wherein the sensor is positioned above the item conveyor and is configured to detect a height of at least one of the plurality of items on the item conveyor;
    a second sensor positioned above the tray conveyor and configured to detect a height of at least one of the plurality of items in the tray,
    wherein the controller is further configured to move the tray conveyor based on the detected height of at least one of the items received in the tray;
    a first detector coupled with the tray conveyor and configured to sense the presence of the tray on the tray conveyor in a starting position,
    a second detector coupled with the tray conveyor at an ending position that is upstream from the starting position and configured to sense the absence of the tray from the ending position,
    wherein the controller is configured to move the tray conveyor based on the sensed presence and absence of the tray on the tray conveyor in the starting and ending positions, respectively, such that a second tray is moved on the tray conveyor in the second direction to the starting position to begin receiving additional items injected from the item conveyor; and
    a guide paddle coupled with the controller and positioned generally over the tray conveyor, wherein the controller is further configured to move the guide paddle at least partially into the tray based on the sensed presence of the tray and based on the detected height of at least one of the items received in the tray such that the one or more of the plurality of items injected from the item conveyor deflects off the guide paddle and falls into the tray.

2. The system of claim 1, wherein the sensor is positioned above the item conveyor and is configured to detect a height of at least one of the plurality of items on the item conveyor.

3. The system of claim 2, wherein the sensor is configured to sense the height of at least one of the plurality of items in a shingled arrangement on the item conveyor, and wherein the item conveyor is configured to inject the one or more of the plurality of items in the shingled arrangement from the item conveyor.

4. The system of claim 1, wherein the sensor is positioned above the tray conveyor and is configured to detect a height of at least one of the plurality of items in the tray.

5. The system of claim 1, wherein the controller is further configured to move the tray conveyor a first amount for a detected increase in height of at least one of the items received in the tray.

6. The system of claim 5, wherein the detected increase in height of the items received in the tray is a cumulative height based on one or more individual measurements of height of at least one of the items in the tray.

7. The system of claim 1, wherein the first detector senses the presence of a forward portion of the tray at the starting position, and the second detector senses the absence of a rearward portion of the tray at the ending position.

8. The system of claim 1, wherein the first detector senses the presence of the second tray at the starting position.

9. The system of claim 1, wherein the controller is further configured to extend the guide paddle at least partially into the tray based on the sensed presence of the tray at the starting position, to maintain the position of the guide paddle therein based on the detected height of at least one of the items received in the tray being less than a full height, and to retract the guide paddle out of the tray based on the detected height of at least one of the items received in the tray being greater than or equal to the full height.

10. The system of claim 1, the item conveyor having a first section configured to move the plurality of items at a first speed and a second section configured to move the plurality of items at a second speed that is greater than the first speed.

* * * * *